United States Patent [19]

Miyagi et al.

[11] Patent Number: 4,732,232

[45] Date of Patent: Mar. 22, 1988

[54] TILTABLE SHIFT LEVER ASSEMBLY FOR AUTOMOTIVE VEHICLE TRANSMISSION

[75] Inventors: Junichi Miyagi, Aichi; Zenichi Nobata, Anjo; Motoharu Akiyama, Chiryu; Yoshitaka Sekiya, Aichi, all of Japan

[73] Assignees: Toyota Jidosha Kabushiki Kaisha; Mannoh Kogyo Co., Ltd., both of Aichi, Japan

[21] Appl. No.: 37,385

[22] Filed: Apr. 10, 1987

[30] Foreign Application Priority Data

| Apr. 14, 1986 | [JP] | Japan | 61-85656 |
|---|---|---|---|
| Apr. 18, 1986 | [JP] | Japan | 61-90254 |
| Apr. 18, 1986 | [JP] | Japan | 61-90255 |
| Apr. 18, 1986 | [JP] | Japan | 61-90256 |
| Apr. 18, 1986 | [JP] | Japan | 61-90257 |
| Apr. 18, 1986 | [JP] | Japan | 61-90258 |
| Apr. 18, 1986 | [JP] | Japan | 61-90259 |
| Apr. 18, 1986 | [JP] | Japan | 61-90260 |

[51] Int. Cl.$^4$ .............................................. B60K 19/12
[52] U.S. Cl. .................................. 180/336; 74/473 R
[58] Field of Search ................... 180/336, 89.14; 74/473 R, 473 P, 477, 522

[56] References Cited

U.S. PATENT DOCUMENTS

| 3,665,776 | 5/1972 | Hess | 74/473 P |
|---|---|---|---|
| 3,766,799 | 10/1973 | De Sloovere | 74/473 R |
| 4,073,199 | 2/1978 | Simons | 74/473 R |

FOREIGN PATENT DOCUMENTS

| 216179 | 1/1957 | Australia | 74/473 R |
|---|---|---|---|
| 2496930 | 6/1982 | France | 180/336 |
| 56-32887 | 8/1981 | Japan | |
| 56-42729 | 10/1981 | Japan | |
| 62-1219 | 1/1987 | Japan | |

Primary Examiner—Ross Weaver
Attorney, Agent, or Firm—Parkhurst & Oliff

[57] ABSTRACT

A tiltable shift lever assembly for operating a transmission of a vehicle, including a shift lever disposed between a driver's seat and a front passenger's seat, so as to extend generally upward when placed in its operative position. The shift lever is supported pivotally about a first pivot axis substantially parallel to a transverse direction of the vehicle. The shift lever has an upper portion having a knob, a lower portion operatively connected to the transmission, and a coupling connecting the upper and lower portions such that the upper portion is pivotable, about a second pivot axis substantially parallel to a longitudinal direction of the vehicle. A fixed guide member is disposed above the coupling of the shift lever, and has a guide slot formed in a direction substantially parallel to the longitudinal direction of the vehicle. The upper portion of the shift lever extends through the guide slot, and is guided by the guide slot for a pivotal movement of the shift lever about the first pivot axis. The guide member further has a lateral slot formed so as to extend in the transverse direction from one longitudinal position of the guide slot. The lateral slot permits the upper portion of the shift lever to be pivoted about the second pivot axis until the upper portion is placed in a substantially horizontal position thereof.

18 Claims, 28 Drawing Figures

TILTABLE SHIFT LEVER ASSEMBLY FOR AUTOMOTIVE VEHICLE TRANSMISSION

BACKGROUND OF THE INVENTION

1. Field of the Invention

The present invention relates in general to a shift lever assembly for operating a transmission of an automotive vehicle, and more particularly to such a shift lever assembly of a floor shift type having a tiltable shift lever which is disposed between a driver's seat and a front passenger's seat and which is tiltable to its inoperative position when the transmission is placed in a given operating position.

2. Discussion of the Prior Art

Recently, a so-called "floor shift" type shift lever is widely employed in an automotive vehicle equipped with an automatic transmission. This type of shift lever is positioned between the driver's seat and the front passenger's seat, so as to extend generally upward above the floor of the driver's compartment. The shift lever is operatively connected to the automatic transmission via a control link including a control cable, for changing the operating position of the transmission.

In an automobile equipped with a shift lever assembly including the above type of shift lever, the driver is sometimes required to move to or from the driver's seat, past the front passenger's seat when the driver gets on or off the automobile, in the case where the automotible is parked in a very narrow parking space or in a heavy traffic. In this case, the upwardly extending shift lever becomes an obstruction which disturbs the movement of the driver from the driver's seat to the passenger's seat or vice versa.

In the light of the above inconvenience, there has been proposed a tiltable shift lever assembly as disclosed for example in Laid-open publications 56-32887 and 56-42729 of Japanese Utility Model Applications, wherein a shift lever includes an upper and a lower portion which are coupled together by a pin, so that the upper portion is tiltable relative to the lower portion, for facilitating the movement of a person between the driver's and front passenger's seats.

In the proposed tiltable shift lever assembly, the upper portion of the shift lever is tilted in the longitudinal direction of the vehicle or shifting direction of the shift lever for an automatic transmission (in the primary shifting direction for a manually operated transmission). Further, there is no limitation in the shifting position of the shift lever in which the upper portion of the lever is tiltable.

If the upper portion of the shift lever is tilted toward the vehicle front, the tilted upper portion lies on the floor and tends to be an obstruction, particularly where the shift lever assembly is installed in a cab-over engine vehicle. If the upper portion of the lever is tilted toward the back of the vehicle, the tilted upper portion may interfere with a parking brake lever, and cannot take a sufficiently low position. A further drawback of the proposed tiltable shift lever assembly is caused by the coupling portion between the upper and lower portions of the shift lever. That is, when the upper portion is placed in its tilted position, the coupling portion is exposed as a projection extending from the lower portion of the lever. This projection may catch the clothes of the person in motion between the front seats of the vehicle.

If the upper portion of the shift lever is placed in its tilted position with the shift lever held in the neutral position while the vehicle is parked with the engine kept on, the shift lever may be unexpectedly moved to the other shift position if the driver's body contacts the tilted shift lever during the movement from the driver's seat to the front passenger's seat, for example.

SUMMARY OF THE INVENTION

It is accordingly an object of the present invention to provide a tiltable shift lever assembly having a tiltable shift lever for operating a transmission of an automotive vehicle, wherein the tilted shift lever does not disturb a movement of a person to and from the driver's seat past the front passenger's seat.

It is another object of the invention to provide such a tiltable shift lever assembly which is easy and safe to operate.

It is a further object of the invention to provide such a tiltable shift lever assembly wherein the tilted upper portion of the shift lever is suitably maintained in its tilted position.

Still further object of the invention is to provide such a tiltable shift lever assembly wherein the tilted upper portion of the shift lever is easily returned to the normal operative position.

It is yet another object of the invention to provide such a tiltable shift lever assembly which is adapted to a cab-over engine vehicle.

According to the present invention, there is provided a tiltable shift lever assembly for operating a transmission of an automotive vehicle which has a floor, a driver's seat, and a front passenger's seat, the tiltable shift lever assembly including a shift lever disposed between the driver's seat and the front passenger's seat, so as to extend generally upward above the floor when placed in an operative position thereof, and a guide member for guiding the shift lever. The shift lever has a shift knob at an upper end thereof and is supported pivotally about a first pivot axis which is substantially parallel to a transverse direction of the vehicle.

The shift lever includes an upper portion having the shift knob, a lower portion operatively connected to the transmission, and a coupling connecting the upper and lower portions such that the upper portion is pivotable relative to the lower portion, about a second pivot axis which is substantially parallel to a longitudinal direction of the vehicle. The guide member is fixedly disposed above the coupling of the shift lever, and has a guide slot formed therethrough in a direction substantially parallel to the longitudinal direction. The upper portion of the shift lever extends through the guide slot, and is guided by the guide slot during a pivotal movement of the shift lever about the first pivot axis.

The guide member further has a lateral slot formed therethrough so as to extend in the transverse direction from one longitudinal position of the guide slot. The lateral slot permits the upper portion of the shift lever to be pivoted about the second pivot axis until the upper portion is placed in a substantially horizontal tilted position thereof.

In the tiltable shift lever assembly of the present invention constructed as described above, the upper portion of the shift lever can be tilted only when the shift lever is placed in the predetermined one longitudinal position of the guide slot, for example, in the parking position, since the lateral slot permiting the tilting of the upper portion is formed so as to extend from that longitudinal position of the guide slot.

Further, since the second pivot axis about which the upper portion of the shift lever is pivoted is parallel to the longitudinal direction of the vehicle, the upper portion is tilted in the transverse direction of the vehicle, for example, toward the front passenger's seat. Thus, the tilted upper portion of the shift lever may lie along the front surface of the front passenger's seat. In this case, the tilted shift lever is less likely to disturb the movement of a person to and from the driver's seat.

According to one feature of the invention, the guide member covers the coupling and lower portion of the shift lever. In this case, the coupling is not exposed even when the upper portion of the shift lever is placed in its tilted position, whereby the coupling portion will not catch the clothes of the driver or passenger.

According to another feature of the invention, the shift lever assembly further comprises a covering member which covers the guide member, and the coupling and lower portion of the shift lever. The covering member has an opening through which the upper portion of the shift lever extends and which permits the upper portion to be pivoted about the first and second pivot axes. In this case, the covering member prevents the internal mechanisms of the shift lever assembly from catching or spoiling the clothes of the driver or passenger while moving to and from the driver's seat.

According to a further feature of the invention, the shift lever has a parking position for placing the transmission in a parking state. In this case, the lateral slot originates from the parking position of the guide slot, and the shift lever is maintained in the parking position even if the tilted upper portion of the lever is returned to the operative position.

According to yet another feature of the invention, the shift lever assembly is adapted to the vehicle whose floor includes a stepped portion having a generally upwardly extending part that extends from an extremity of a horizontal portion of the floor in front of the driver's and front passenger's seats. An extension plane of the generally upwardly extending part and extension planes of upper surfaces of the seats, define an accommodation space on a side nearer to the seats. The coupling is positioned within the accommodation space, and the upper portion of the shift lever when placed in the substantially horizontal position lies in the accommodation space. Therefore, the tilted upper portion of the shift lever is hardly an obstruction to the driver or passenger moving past the shift lever assembly, particular where the upper portion of the shift lever is adapted to be pivoted toward the front passenger's seat.

According to another feature of the invention, the shift lever assembly further has a movable stop member which is movable between an operative position in which the stop member blocks the upper portion of the shift lever from moving through the lateral slot from the longitudinal guide slot, and a retracted position in which the stop member permits the upper portion to move through the lateral slot. This movable stop member is moved from the operative position to the retracted position by operating a manually controlled member connected to the stop member. In this case, the pivotal movement of the upper portion of the lever is permitted only when the manually operated member is manipulated to move the stop member to its retracted position. Therefore, the arrangement avoids damaging the front passenger due to an unexpected tilting of the shift lever.

According to one preferred form of the above feature of the invention, the shift lever assembly further comprises a stop-member spring for biasing the movable stop member toward the operative position, and the movable stop member is supported by the guide member pivotally about a third pivot axis. The guide member has an arcuate groove formed therethrough along an arc of a circle having a center on the third pivot axis. The manually controlled member extends through the arcuate groove. The operative and retracted positions of the movable stop member are determined by abutting contact of the manually operated member with respective portions of the guide member which define opposite ends of the arcuate groove.

According to another preferred form of the above feature of the invention, the shift lever assembly further comprising a stop-member spring for biasing the movable stop member toward the operative position, and the movable stop member includes an inclined portion which comes into contact with the upper portion of the shift lever when the upper portion is returned from the substantially horizontal position to the operative position thereof. The inclined portion has an inclined surface inclined relative to the longitudinal direction of the lateral slot. In this arrangement, the movable stop member is automatically moved to the retracted position against a biasing action of the stop-member spring, due to abutting contact of the upper portion of the lever with the inclined surface of the stop member during a pivotal motion of the upper portion to the operative position thereof. According to the present arrangement, the upper portion of the shift lever is maintained in its tilted position by the stop member held in its operative position by the stop-member spring. Further, the tilted upper portion of the lever is easily returned to its operative position without operating the manually controlled member, since the stop member is automatically moved to its retracted position by the return movement of the upper portion of the lever.

According to a further preferred form of the same feature of the invention, the shift lever assembly further comprises a lever spring for biasing the upper portion of the shift lever to force the upper portion against one of opposite inner surfaces of the guide member which define the guide slot. The lateral slot originates from the above-indicated one of the opposite inner surfaces of the guide member, whereby the upper portion of the shift lever is pivoted toward its substantially horizontal position by a biasing force of the lever spring while being guided through the lateral slot, when the movable stop member is moved to its retracted position. Thus, the upper portion of the shift lever is easily tilted to the substantially horizontal position, by simply retracting the stop member away from the lateral slot.

In the above form of the invention, the shift lever assembly may further comprise temporary stop means for temporarily stopping a pivotal motion of the upper portion of the shift lever due to the biasing force of the lever spring, at an intermediate position between opposite longitudinal ends of the lateral slot. In this case, the lateral slot has an intermediate portion which is farthest from the second pivot axis, and the shift lever when placed in the one longitudinal position of the guide slot is inclined with respect to the vertical, in a plane substantially parallel to the vertical and the second pivot axis, so that the upper portion of the shift lever when positioned so as to extend through the lateral slot is maintained in sliding contact with one of opposite inner surfaces of the guide member defining the lateral slot, due to gravity of the inclined shift lever. For instance, the temporary stop means includes engagement means provided on the upper portion of the shift lever. The engagement means is adapted to come into engagement with the above-indicated one of opposite inner surfaces of the lateral slot and thereby stop the pivotal movement thereof when the upper portion reaches the intermediate portion of the lateral slot. The engagement means permitsg the upper portion of the shift lever to be manually moved from the intermediate position of the lateral slot to the substantially horizontal position.

According to the above arrangement, the upper portion of the shift lever will not be pivoted down by the biasing force of the lever spring, in one motion all the way to the tilted position. Namely, the upper lever portion is temporarily stopped at the intermediate portion between the longitudinal ends of the lateral slot. Thereafter, the upper lever portion may be tilted down to the substantially horizontal position by the operator. Thus, the instant tiltable shift lever is safe to operate.

The engagement means may have an inclined surface which is engageable with the above-indicated one inner surface of the guide member, when the upper portion of the shift lever reaches the intermediate position. The biasing force of the lever spring and an angle of inclination of the inclined surface of the engagement means are determined so that an engagement of the inclined surface with the one inner surface is not released by the biasing force of the lever spring.

In accordance with one arrangement according to the above-indicated one form of the invention wherein the upper portion of the shift lever is biased by the lever spring, the shift lever assembly is adapted to the vehicle which has a tiltable cab pivotable to a tilted position, about a fourth pivot axis located near a front end of the vehicle, such that the shift lever assembly remains in position on a frame of the vehicle. In this case, the biasing force of the lever spring is determined so as to permit the upper portion of the shift lever to be pivoted by the tiltable cab from the substantially horizontal position to the operative position where the tiltable cap is pivoted to the tilted position with the upper portion placed in the substantially horizontal position. In this arrangement, the tilted upper portion of the shift lever may be automatically returned to its operative position by a pivotal movement of the cab to its tilted position, even if the cab is tilted while the upper portion of the shift lever is placed in its tilted position.

According to still another feature of the invention, the second pivot axis of the upper portion of the shift lever is offset by a first predetermined distance from the first pivot axis of the shift lever in a substantially vertical direction, and a centerline of the upper portion is offset by a second predetermined distance from the second pivot axis in the transverse direction of the vehicle. In this arrangement, the height of the upper portion of the shift lever when placed in its tilted position, and the distance of projection of the tilted shift lever in the transverse direction of the vehicle, can be suitably selected by changing the first and second offset distances indicated above. Therefore, instant shift lever assembly may be used in various environments in terms of the configuration of the driver's and front passenger's seats, and the configuration of the portion of the floor near the shift lever assembly.

BRIEF DESCRIPTION OF THE DRAWINGS

The above and other objects, features and advantages of the present invention will be better understood by reading the following detailed description of several preferred embodiments of the invention, when considered in connection with the accompanying drawings, in which.

DETAILED DESCRIPTION OF THE PREFERRED EMBODIMENTS

Figure 1:
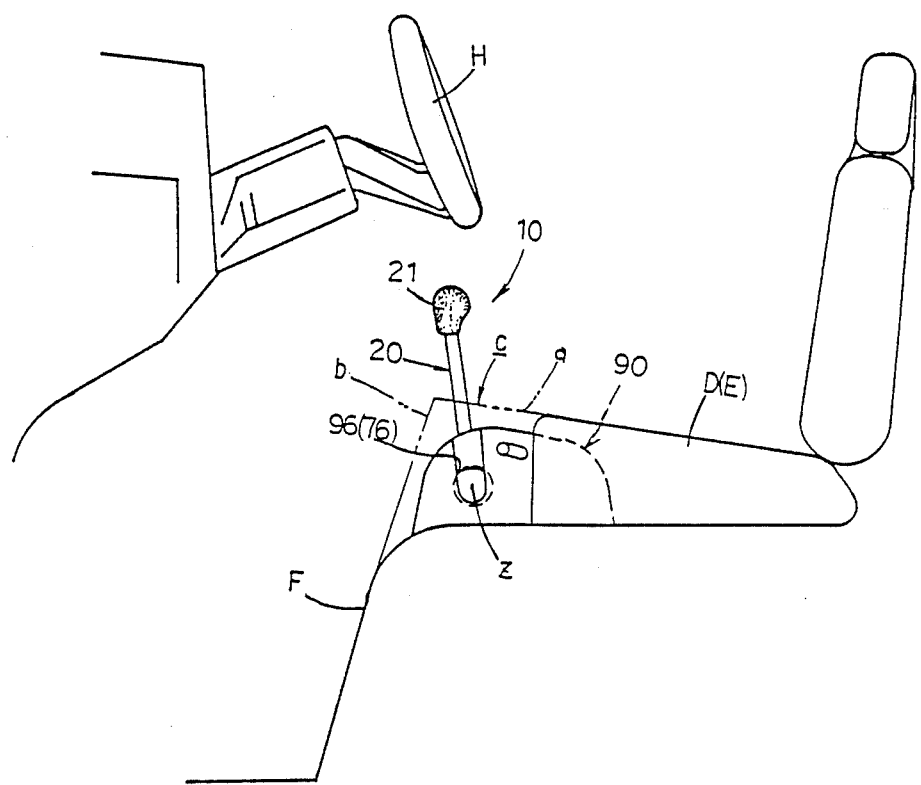
FIG. 1 is a schematic side elevation of a driver's compartment of a cab-over engine vehicle equipped with one embodiment of a tiltable shift lever assembly of the present invention for operating a transmission.
Figure 2:
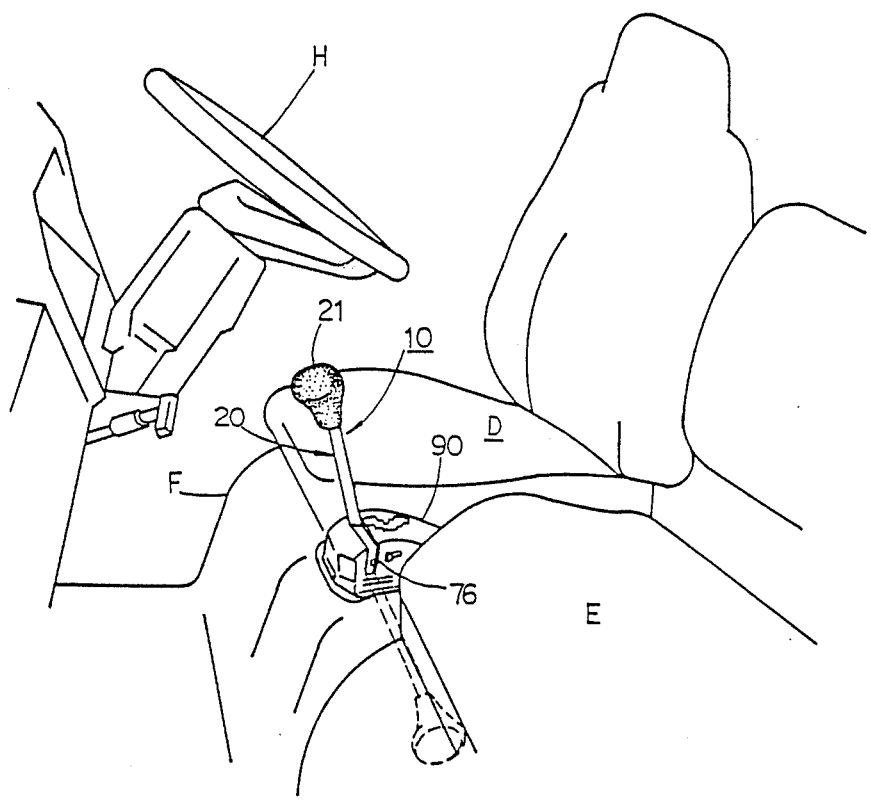
FIG. 2 is a perspective view of the driver's compartment of FIG. 1.
Figure 3:
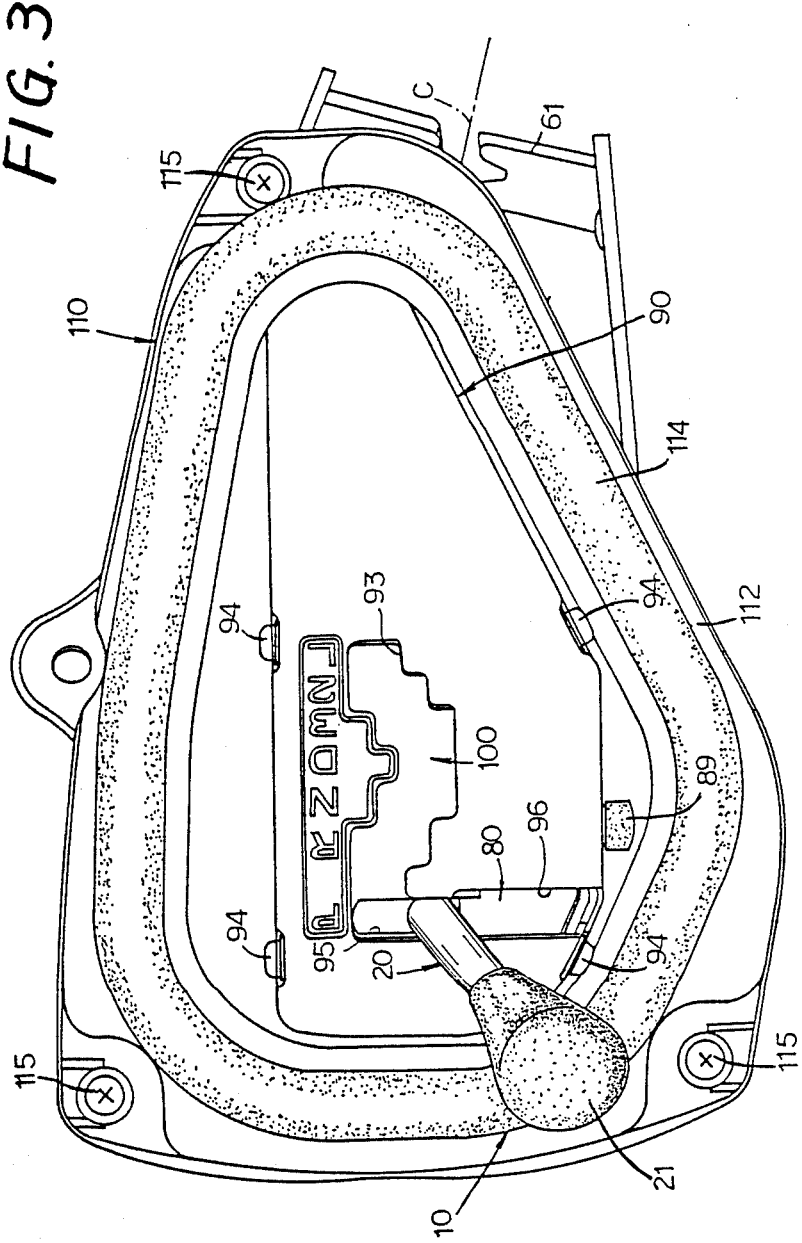
FIG. 3 is a plan view of the shift lever assembly, showing a tiltable shift lever in its parking position.
Figure 4:
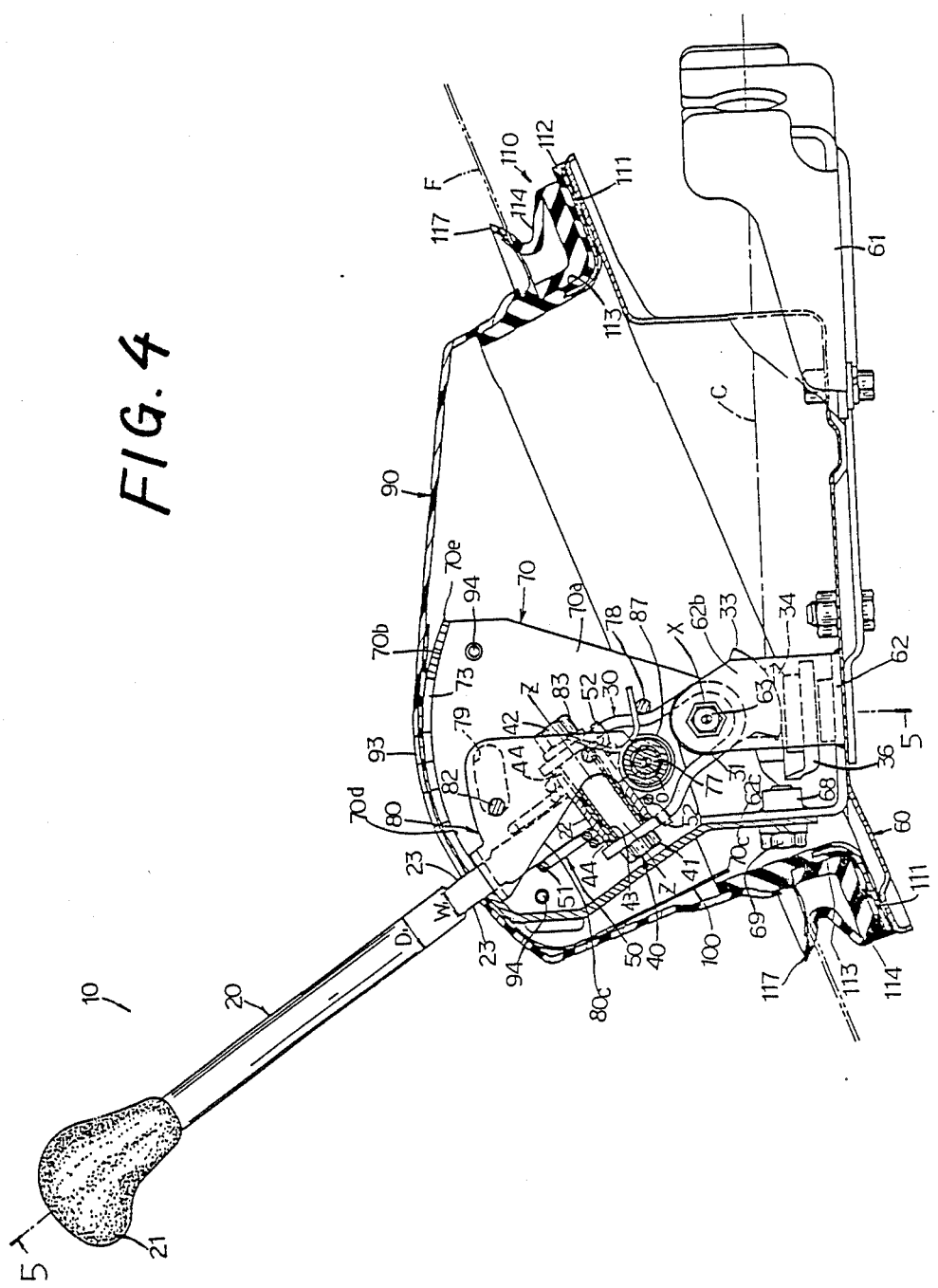
FIG. 4 is a fragmentary elevational view in cross section of the shift lever assembly, taken in the longitudinal direction of the vehicle.
Figure 5:
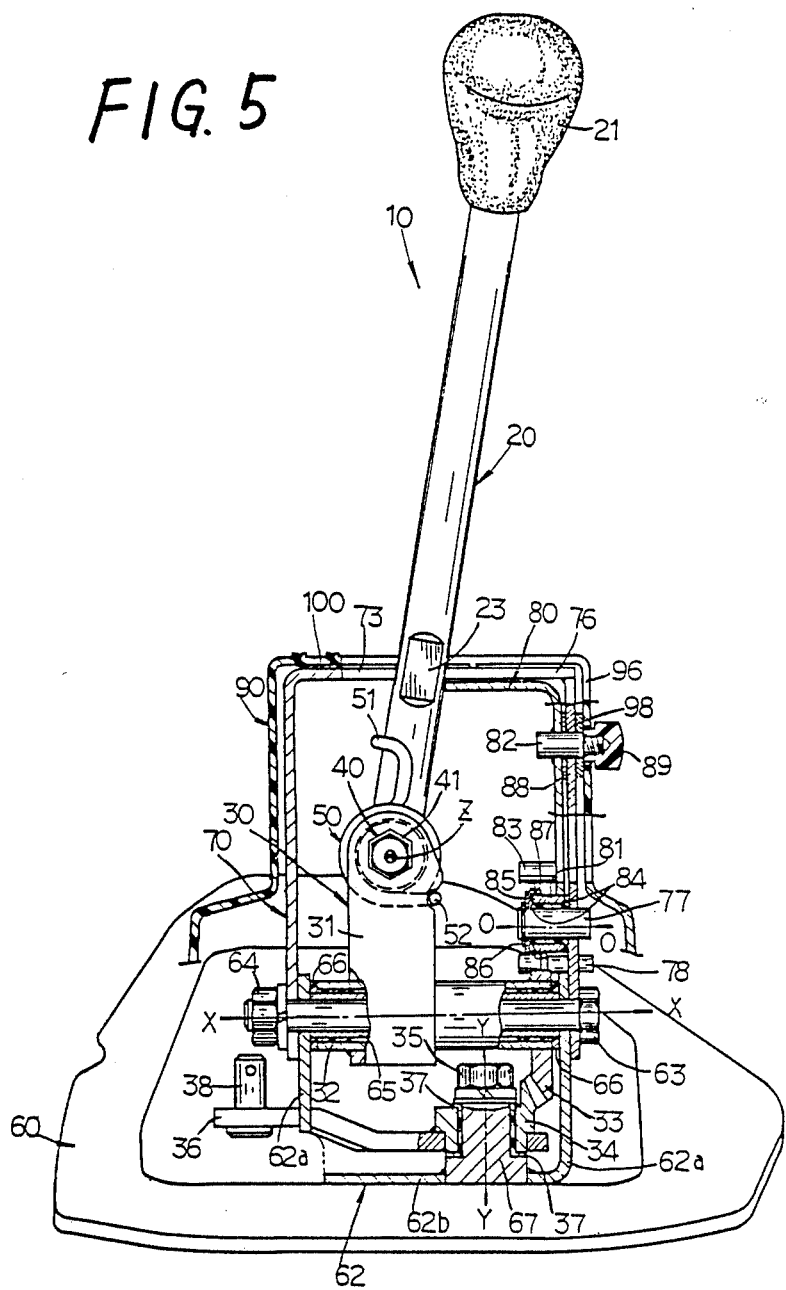
FIG. 5 is an elevational view in cross section taken along line 5—5 of FIG. 4.

Referring first to FIGS. 1 and 2, there is shown a driver's compartment of a motor vehicle of a cab-over engine type equipped with a tiltable shift lever assembly which has a tiltable shift lever 10 operatively linked with an automatic transmission (not shown) of the vehicle. As shown in FIG. 2, the shift lever 10 is disposed between a driver's seat D and a front passengager's seat E, so as to extend generally upward above a floor F when placed in an operative position. As illustrated in FIGS. 3-5, the shift lever assembly further includes a torsion spring 50 attached to the shift lever 10, a lower bracket 60 for supporting the shift lever 10, a guide member 70 for positioning the shift lever 10 at its shift positions, a pivotable stop member 80 for blocking a tilting movement of the shift lever 10, a covering member 90 covering the shift lever assembly, a sliding plate 100 for indicating the shift positions, and a dust boot 110.

The tiltable shift lever 10 includes an upper lever portion 20 having a knob 21 at its upper end, a lower lever portion 30 operatively connected to the automatic transmission, and a coupling 40 connecting the upper and lower lever portions 20, 30 such that the upper lever portion 20 is pivotable relative to the lower lever portion 30.

Described more specifically, the lower end of the upper lever portion 20 is welded to a sleeve 22 as shown in FIG. 4, while the lower lever portion 30 consists of a bifurcated lever support 31 and a sleeve 32 which are welded together as shown in FIGS. 4 and 5. The lever support 31 is connected at its upper end portion to the sleeve 22 by a bolt 41 which is inserted through holes formed in opposite arm portions of the support 31, and through the sleeve 22 disposed between the opposite arm portions of the support. The bolt 41 is tightened by a nut 42 via a spring washer. Between the bolt 41 and the sleeve 22, there are coaxially interposed a collar 43 and a pair of flanged bushings 44, 44 made of a resin material. Thus, the upper lever portion 20 is supported pivotally about an axis Z—Z (centerline of the bolt 41), in a transverse direction of the vehicle (vertical direction as seen in FIG. 3).

The torsion spring 50 is wound on the sleeve 22 such that its intermediate portion 51 is fixed to the upper lever portion 20, while its opposite ends are fixed to the opposite arm portions of the bifurcated lever support 31. With this torsion spring 50, the upper lever portion 20 is biased in the right direction of FIG. 5 (in the tiltdown direction). The torsion spring 50 may be replaced by a tension spring.

The lower bracket 60 is secured to a cross member of a chassis frame of the vehicle body, together with a cable bracket 61 fixed to the lower surface of the bracket 60 by bolts and nuts. The shift lever 10 is supported by the lower bracket 60 pivotally in the longitudinal direction of the vehicle.

Figure 9:
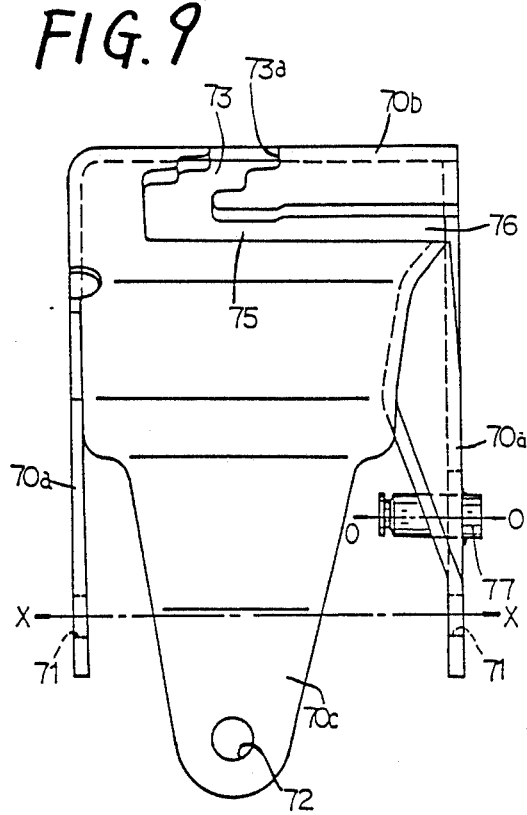
FIG. 9 is a front elevational view of the guide plate.

Described in more detail, a lever retainer 62 having a pair of upright portions 62a, 62a is welded to the upper surface of the lower bracket 60. As shown in FIG. 9, the guide member 70 has opposite longitudinal side walls 70a, 70a extending in the longtudinal direction of the vehicle. The side walls 70a, 70a have holes 71, 71. Lower parts of the side walls 70a, 70a are positioned outside the upper parts of the upright portions 62a, 62a. And a bolt 63 is inserted through the holes 71, 71 and corresponding holes in the upright portions 62a, 62, and through the sleeve 32 disposed between the upright portions 62a, 62a. The bolt 63 is tightened by a nut 64 via a spring washer. Between the bolt 63 and the sleeve 32, there are coaxially interposed a collar 65 and a pair of flanged bushings 66, 66 made of a resin material. Thus, the shift lever 10 is supported pivotally about an axis X—X (centerline of the bolt 63), in the longitudinal direction of the vehicle (right and left directions in FIG. 4). As indicated in FIG. 3, the shift lever 10 has seven shift positions which are arranged in the longitudinal direction of the vehicle. These shift positions are: PARKING (P); REVERSE (R); NEUTRAL (N); DRIVE (D); THIRD GEAR (3); SECOND GEAR (2); and LOW GEAR (L), as seen from the front of the vehicle.

As shown in FIG. 5, an upper bevel gear 33 is fixed to the sleeve 32 of the lower lever portion 30 of the shift lever 10, by way of welding, calking, press-fitting, or other suitable means. This upper bevel gear 33 meshes with a lower bevel gear 34 which is rotatably supported on a pin 67 via a plate washer and a spring washer. The pin 67 is fitted at its bottom portion in a hole formed in a horizontal base portion 62b of the lever retainer 62, and is welded to the base portion 62b. The lower bevel gear 34 is held on the pin 67 by a nut 35 screwed on the upper end of the pin 67. A control lever 36 is welded to the lower bevel gear 34, so that the control lever 36 is pivotable about an axis Y—Y (centerline of the pin 67). Reference numeral 37 designates a pair of flanged resin bushings interposed between the pin 67 and the lower bevel gear 34. The control lever 36 has a pin 38 fixed thereto. An eyed end of a control cable is fitted on the pin 38 via a rubber bushing (not shown). The control cable is operatively connected to the automatic transmission of the vehicle. In the above arrangement, a pivotal movement of the tiltable shift lever 10 about the axis X—X is converted by the pair of bevel gears 33, 34 into a pivotal movement of the control lever 36 about the axis Y—Y, which in turn is converted into a linear movement of the control cable in the longitudinal direction of the vehicle. Thus, the transmission is shifted to a desired position. The control cable is indicated at C in one-dot chain line in FIGS. 4 and 6.

Figure 7:
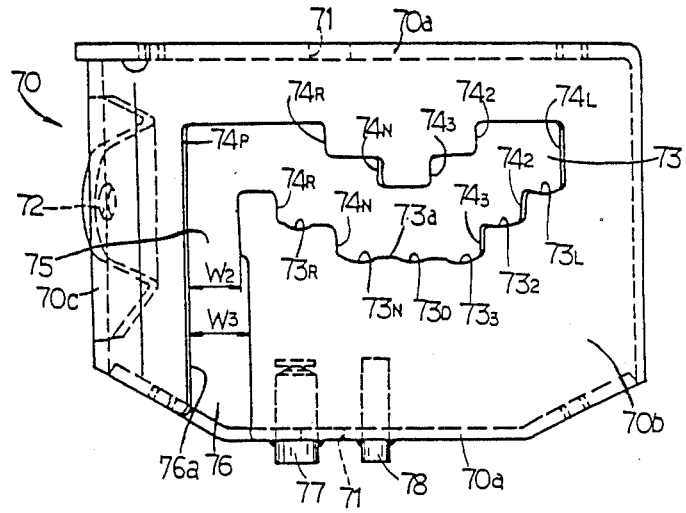
FIG. 7 is an enlarged plan view of a guide member for the tiltable shift lever, taken in the direction of arrow VII of FIG. 8.
Figure 8:
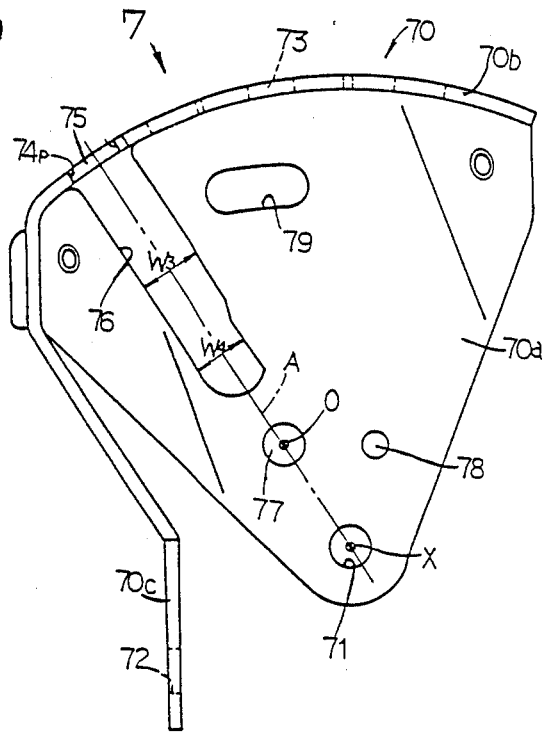
FIG. 8 is a side elevational view of the guide plate.

The guide member 70 has a front wall 70c having a hole 72, as indicated in FIGS. 7-9, while the lever retainer 62 has a front upright portion 62c, as shown in FIG. 4. The guide plate 70 is secured to the lever retainer 62, by the bolt 63 extending through its holes 71, 71 (as previously described), and a bolt 69 which extends through the hole 72 and is welded to the front upright portion 62c of the lever retainer 62.

The guide member 70 has a top wall 70b which has a curvature following an arc of a circle having a center at the axis X—X (center of the holes 71, 71), as indicated in FIG. 8. The top wall 70b has a guide slot 73 formed through its thickness such that the slot 73 extends generally in the longitudinal direction of the vehicle (in the shifting direction of the lever 10), as shown in FIG. 7. The guide slot 73 has steps in the transverse direction of the vehicle, for establishing the shift positions of the shift lever 10 whose upper portion 20 extends through the slot 73. The upper lever portion 20 of the shift lever 10 is held by the torsion spring 50, in pressed contact with one of inner surfaces of the top wall 70b which define the guide slot 73, i.e., a surface 73a on the side of the front passenger's seat (E). The inner surface 73a has arcuate grooves $73_R$, $73_N$, $73_D$, $73_3$, $73_2$ and $73_L$, at portions corresponding to the shift positions (R), (N), (D), (3), (2) and (L); in order to enable the vehicle driver to feel the respective shift positions. The shift positions (N), (d) and (3) are obtained in a first plane, and the shift positions (R) and (3) are obtained in a second plane one step spaced away from the first plane in the direction toward the driver's seat D or upward direction of FIG. 7 by pivoting the shift lever 10 about the axis Z—Z. Further, the shift positions (P) and (L) are obtained in a third plane two steps spaced away from the first plane toward the driver's seat D by further pivoting the shift lever 10 about the axis Z—Z.

The inner surface 73a further has shoulders $74_P$, $74_R$, $74_N$, $74_3$, $74_2$ and $74_L$ for determining the respective shift positions. More specifically, the upper lever portion 20 has a pair of parallel flats 23, 23 such that a distance W1 (FIG. 7) between the flats 23, 23 is smaller than the diameter of the upper lever portion 20. The upper lever portion 20 is precisely located at each shift position with appropriate one of its flats 23 abutting on the corresponding shoulder $74_P$, $74_R$, $74_N$, $74_3$, $74_2$, $74_L$. The guide slot 73 terminates in a lateral portion 75 which extends a relatively short distance from the shift position (P), in the transverse direction of the vehicle. This lateral portion 75 has a width W2 (FIG. 7) which is slightly smaller than an outside diameter D1 (FIG. 4) of the upper lever portion 20, but is slightly larger than the distance W1 of the parallel flats 23, 23.

The guide member 70 has a lateral slot 76 which extends from the end of the lateral portion 75 of the guide slot 73 in the transverse direction of the vehicle. This lateral slot 76 is formed partly in the top wall 70b, and partly in a side wall 70d, as indicated in FIG. 8. The lateral slot 76 is substantially perpendicular to the lever shifting direction or longitudinal direction of the vehicle, such that a centerline A—A of the slot 76 passes the pivot axis X—X. One of the opposite surfaces defining the lateral slot 76, i.e., surface 76a (FIG. 7) is flush with the shoulder $74_P$ (front end) of the guide slot 73. The portion of the lateral slot 76 on the side of the lateral portion 75 of the guide slot 73 has a width W3 (FIG. 8) which is slightly larger than the outside diameter D1 of the upper portion 20 of the shift lever 10. The terminal end portion of the lateral slot 76 remote from the guide slot 73 has a width W4 which is substantially equal to the width W2 of the lateral portion 75. The side wall 70a of the guide member 70 on the side of the passenger's seat E has two pins 77 and 78 welded thereto, at positions relatively near the pivot axis X—X, such that the pins 77, 78 are parallel to the pivot axis X—X. The pin 77 serves as a pivot axis about which the previously indicated pivotable stop member 80 (whch will be described). The pin 78 serves to hold one end of a return spring (stop-member spring) 87 which will be described. In an upper portion of the side wall 70a relatively distant from the pivot axis X—X, there is formed an arcuate groove 79 along an arc of a circle that has a center on a pivot axis O—O (centerline of the pin 77) about which the pivotable stop member 80 is pivoted. As shown in FIG. 8, the pivot axis O—O (center of the pin 77) lies on the centerline A of the lateral slot 76 (which passes the pivot axis X—X).

Figure 10:
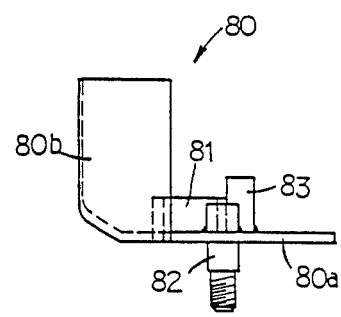
FIG. 10 is an enlarged plan view of a pivotable stop member of the shift lever assembly, taken in the direction of arrow X of FIG. 11.
Figure 11:
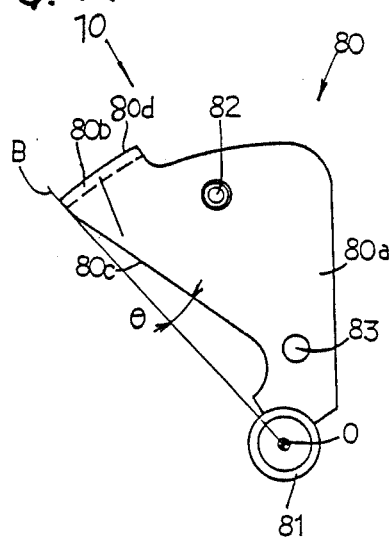
FIG. 11 is a side elevational view of the stop member.
Figure 12:
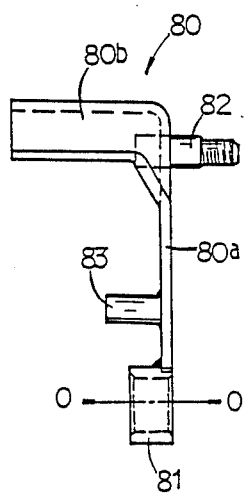
FIG. 12 is a front elevational view of the stop member.

Referring to FIGS. 10-12, the pivotable stop member 80 is generally L-shaped in cross section, and has a side wall 80a, and a top wall 80b which extends from the upper extremity of the side wall 80a such that the top wall 80b is perpendicular to the side wall 80a. The top wall 80b is adapted to partially close the lateral slot 76 and abut on the upper lever portion 20 when the stop member 80 is placed in its operative position. The side wall 80a is welded at its lower extremity to a sleeve 81 which rotatably fits on the pin 77 previously described. The top wall 80b has an arcuate outer surface 80d which is curved along an arc of a circle which has a center on the pivot axis O—O (centerline of the sleeve 81). Namely, the outer surface 80d follows a curve inner surface 70d (FIG. 4) of the top wall 70b of the guide member 70. The side wall 80a has pins 82, 83 welded thereto in parallel to the pivot axis O—O. The pin 82 is provided in an upper portion (remote from the axis O—O) of the side wall 80a, so that the pin 82 extends through the arcuate groove 79. This pin 82 has a manually operated knob 89 fixed at its outer end. The pin 83, which is provided at a position relatively near the axis O—O, serves to hold the other end of the return spring 87 for the stop member 80. The stop member 80 has an inclined surface 80c (left-hand side surface of FIG. 11) which is inclined by an angle $\theta$ with respect to a plane B which includes the axis O—O and the front end of the top wall 80b.

A pair of flanged resin bushings 84, 84 are interposed between the sleeve 81 of the stop member 80, and the pin 77 fixed to the side wall 70a of the guide member 70, so that the stop member 80 is supported pivotally about the pivot axis O—O. An axial movement of the stop member 80 is prevented by a retaining ring 86 fitted in an annular groove formed in the pin 77. A spacer 85 is interposed between the retaining ring 86 and one of the bushings 84. The pivoting angle of the stop member 80 is determined by the opposite ends of the arcuate groove 70, that is, by abutting contact of the pin 82 with the portions of the side wall 70a of the guide member 70 which define the ends of the arcuate groove 79. In other words, the operative and retracted positions of the pivotable stop member 80 are determined by the pin 82 and the groove 79.

The return spring 87 for the pivotable stop member 80 consists of a torsion spring whose intermediate portion is wound on the sleeve 81, and whose opposite ends engage the respective pins 78, 83. This return spring 87 functions to bias the stop member 80 in its operative position, in order to normally block the upper lever portion 20 from being tilted from its shift position (P) in the transverse direction of the vehicle, toward its substantially horizontal position indicated in broken line in FIG. 2. In other words, the return spring 87 biases the stop member 80 in the left direction of FIG. 4 (in the forward running direction of the vehicle). In the operative position of the stop member 80 as shown in FIG. 4, the manually operated knob 82 is held in abutting contact with the left end of the arcuate groove 79, and the portion of the lateral slot 76 near the lateral portion 75 of the guide slot 73 is closed by the top wall 80b of the stop member 80. Thus, the stop member 80 serves as a stop for inhibiting the tilting of the upper lever portion 20, and as a closure member for partially closing the lateral slot 76 while maintaining a sealing between its outer surface 80d and the inner surface 70d of the guide member 70. Reference numeral 88 designates a plate washer which fits on the pin 82 and is interposed between the guide member 70 and the stop member 80. The return spring 87 in the form of the torsion spring in the present embodiment may be replaced by a tension spring.

It is noted that the portions near the washer 88 in FIG. 5 are shown in cross section taken in a plane which includes the axis of the pin 82, for easier understanding of the positional relationship.

Figure 13:
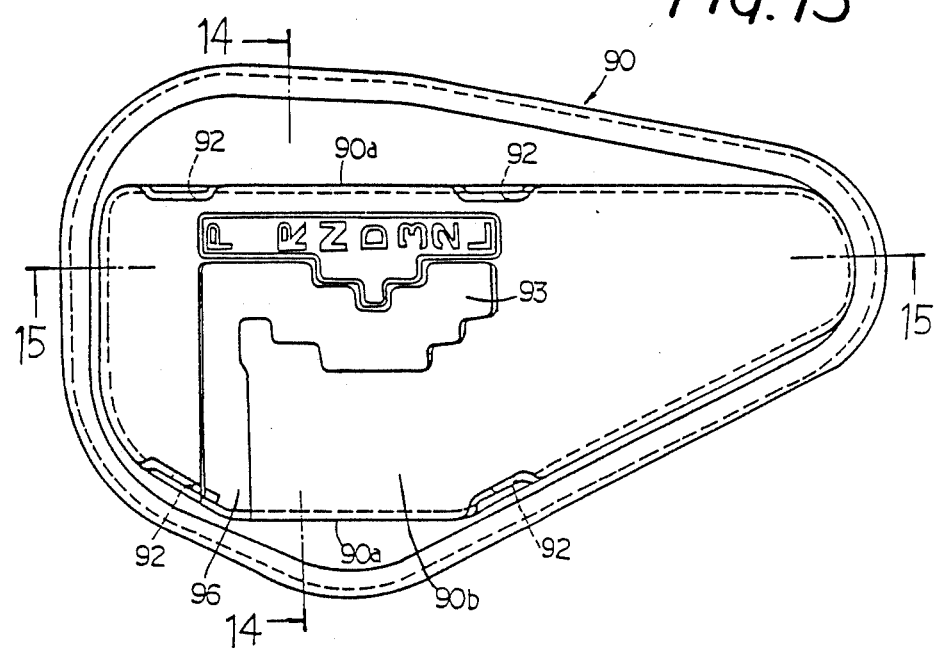
FIG. 13 is a plan view of a covering member of the shift lever assembly.
Figure 14:
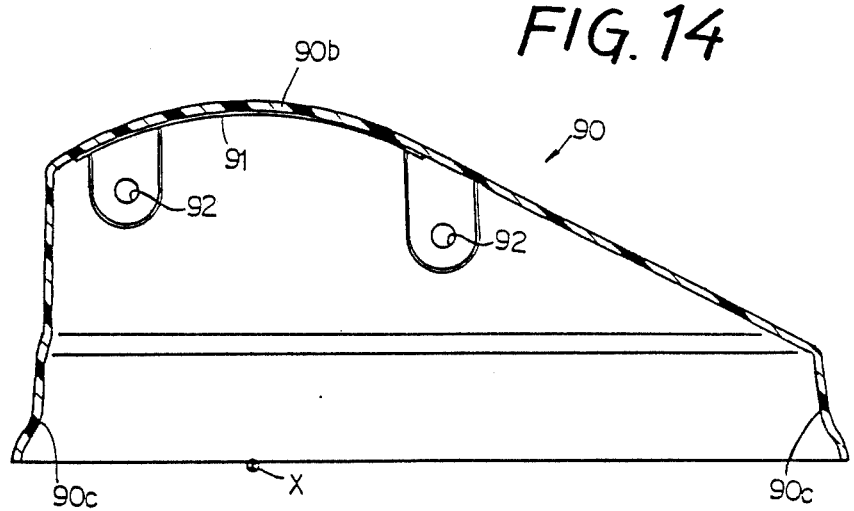
FIG. 14 is an elevational view in cross section taken along line 14—14 of FIG. 13.
Figure 15:
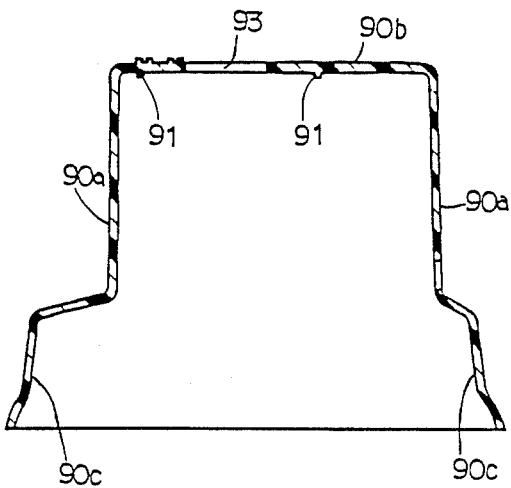
FIG. 15 is an elevational view in cross section taken along line 15—15 of FIG. 13.

Referring to FIGS. 13-15, the covering member 90 is a box-like structure made of a resin material. The covering member 90 includes openings 93, 96 and 99 (FIG. 6) which are identical in shape with the guide slot 73, lateral slot 76 and arcuate groove 79 of the guide member 70. The covering member 90 has a top wall 90b which is curved along the curvature of the top wall 70b of the guide member 70, which has the center on the pivot axis X—X. A pair of parallel ridges 91, 91 are formed on the inner surface of the top wall 90b. The parallel ridges 91, 91 serve to guide the sliding plate 100 (FIGS. 4 and 5) which is interposed between the outer surface of the curved top wall 70b and the inner surface of the curved top wall 90b. The covering member 90 is secured to the guide member 70 by four screws 94 through respective holes 92 which are formed through opposite side walls 90a, 90a of the member 90. The pin 82 extends through the arcuate opening 99, so that the knob 89 is fixed to the outer end of the pin 82. Reference numeral 98 indicates a plate washer which fits on the pin 82 and which is interposed between the guide member 70 and the covering member 90. The covering member 90 has an outwardly inclined base portion 90c, for easier removal from a mold, and easier assembling and improved sealing with respect to the dust boot 110.

Figure 16:
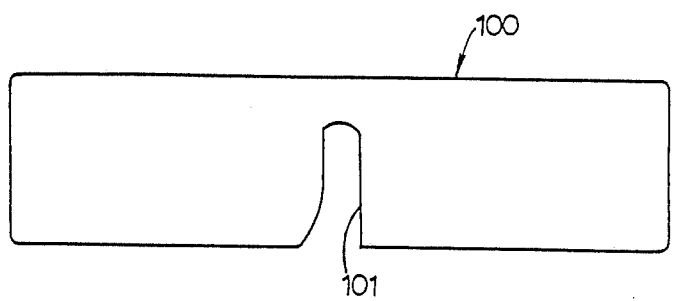
FIG. 16 is a plan view of a sliding plate.

The sliding plate 100 is slidable along and between the curved top walls 70b, 90b of the guide member 70 and covering member 90, together with the shift lever 10, in order to indicate the currently selected shift position of the shift lever 10. Further, the sliding plate 100 closes the lateral slot 76, except when the shift lever 10 is placed in its shift position (P). The sliding plate 100 is formed from a thin elastic sheet of a suitable resin material, which elastic sheet has a cutout 101 formed in the transverse direction, as illustrated in FIG. 16. The parallel flats 23 of the upper lever portion 20 engage the cutout 101, thereby enabling the sliding plate 100 to move with the shift lever 10. The cutout 101 is open at one edge of the sheet on the side of the passenger's seet E (at the lower edge as viewed in FIG. 16). Thus, the cutout 101 permits the upper lever portion 20 to be tilted toward its substantially horizontal tilted position.

Figure 6:
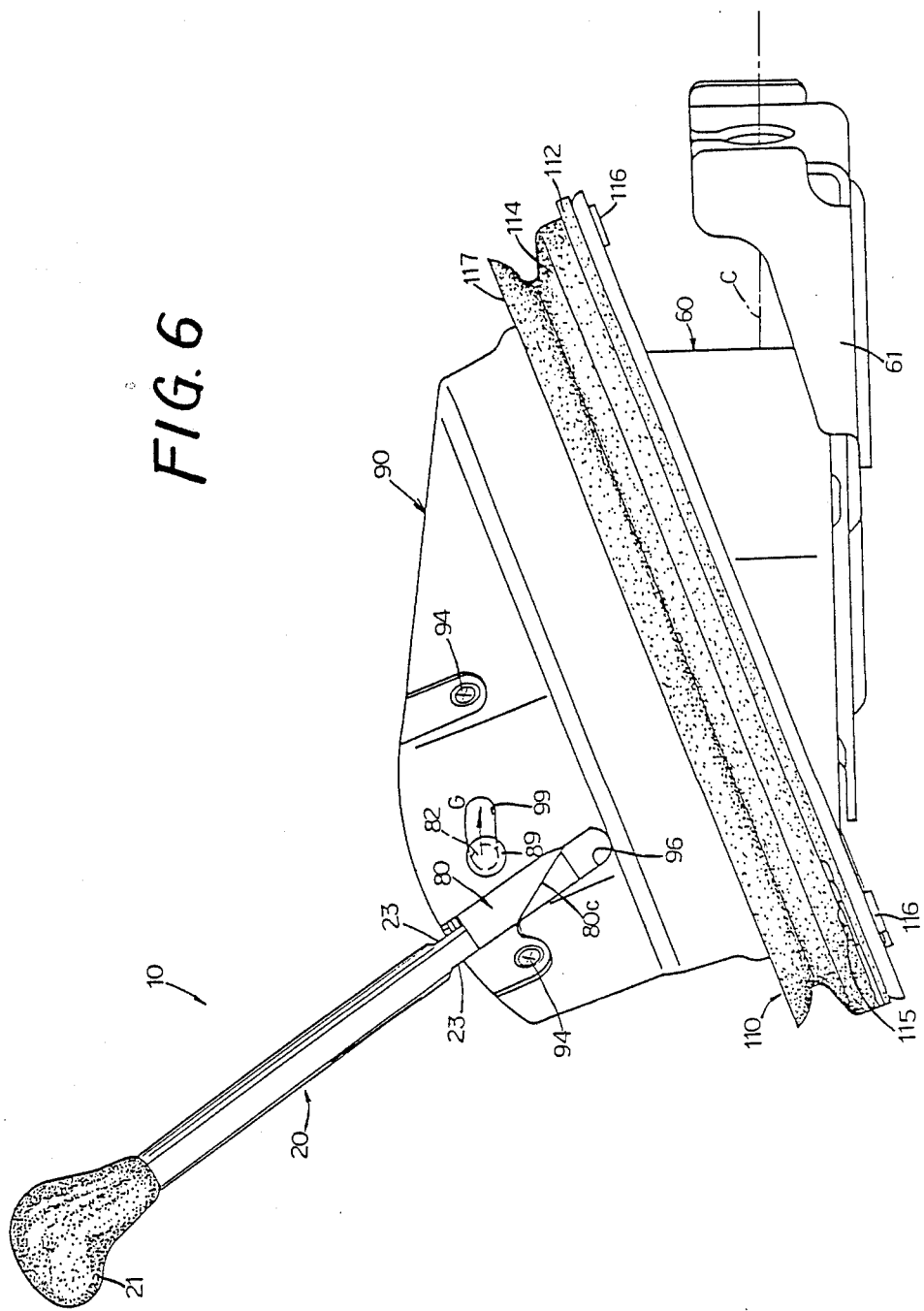
FIG. 6 is a side elevational view of the shift lever assembly.

The dust boot 110 is L-shaped in cross section as seen in FIG. 4, consisting of a base portion 112 and a sealing portion 114 which are made of rubber materials. The base portion 112 has a reinforcing metal plate 111 embedded therein, and an annular groove 113 formed in the outer surface, so that the sealing portion 114 fluid-tightly engages the annular groove 113. The base portion 112 is secured to the lower bracket 60 by three screws 115 (FIG. 3) screwed in respective nuts 116 (FIG. 6) that are welded to the bracket 60. The outer surface of the upper end of the base portion 112 fluid-tightly engages the inner surface of the outwardly included base portion 90c of the covering member 90. The sealing portion 114 has an edge 117, which is shown in FIGS. 4 and 6 in its free state. Namely, the edge 117 is forced down by the lower surface of the floor F indicated in phantom line in FIG. 4, when the present shift lever assembly is installed in place. Thus, the dust boot 112 maintains fluid tightness between the lower bracket 60 and the floor F, and between the floor F and the covering member 90, in order to prevent entry of water, mud, dust and dirt into the interior of the vehicle, and isolate the interior from external noises.

Referring back to FIGS. 1 and 2, the present shift lever assembly having the tiltable shift lever 10 is disposed between the driver's seat D and the front passenger's seat E, as indicated in FIG. 2, such that the covering member 90 is positioned within an accommodation space "c" which is defined by an extension plane "a" of the seats D, E, and an extension plane "b" of a generally upwardly extending part of the floor F. The accommodation space "c" is formed on one side of the extension planes "a", "b", remote from a steering wheel H or nearer to the seats D, E.

In the above arrangement, the top wall 90b of the covering member 90 does not project above the level of the seats D, E, nor project ahead of the generally upwardly extending part of the floor F, which part extends from the rear extremity of the horizontal portion of the floor F in front of the seats D, E.

Further, the accommodation space "c" accommodates the pivot axis Z—Z about which the upper lever portion 20 of the shift lever 10 is pivotable when the lever 10 is placed in its shift position (P) alinged with the lateral slot 76 in the guide member 70 and the opening 96 in the covering member 90. In the tilted position of the upper lever portion 20 as shown in FIG. 2, the upper lever portion 20 and the knob 21 are positioned within the accommodation space "c".

Figure 17:
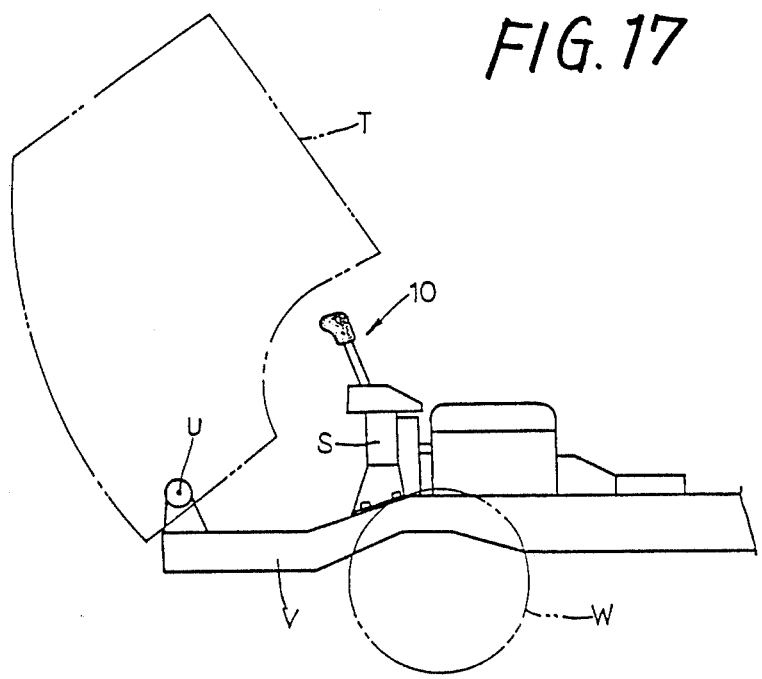
FIG. 17 is a schematic side elevational view showing a tiltable cab of the vehicle when placed in its tilted position.

Referring to FIG. 17, the cab-over engine vehicle on which the present shift lever assembly for the automatic transmission is installed, has a tiltable cab T which is tiltable about an axis U at the front end of the vehicle frame V. As indicated in FIG. 17, the shift lever assembly indicated at S remains in position on the frame V when the cab T is placed in its tilted position. Reference character H designates a front wheel of the vehicle.

In the tilted shift lever assembly constructed as described above, the shift lever 10 is located at the desired one of the shift positions, by pivoting the lever 10 about the axis X—X with or without a pivotal movement of the upper lever portion 20 about the axis Z—Z, while the upper lever portion 20 is guided by the guide slot 73 formed in the guide member 70. The pivotal movement of the shift lever 10 about the axis X—X causes a pivotal movement of the control lever 36 about the axis Y—Y, by means of the pair of bevel gears 33, 34. The pivotal movement of the control lever 36 causes a linear movement of the control cable C, which activates a manual valve lever of the automatic transmission, to establish the appropriate position of the transmission.

While the shift lever 10 is placed in the shift positions other than the PARKING position (P), the upper lever portion 20 is not allowed to the substantially horizontal tilted position, since the upper lever portion 20 is not aligned with the lateral slot 76. In the shift position (P), the torsion spring 59 forces the upper lever portion 20 toward its tilted position, but the tilting movement of the upper lever portion 20 is blocked by the pivotable stop member 80 whose top wall 80b bridges the lateral slot 76 and abuts on the upper lever portion 20. In this condition, the biasing force of the torsion spring 50 exerted on the upper lever portion 20 in the tilting direction is borne by the guide member 70 via the plate washer 88 fitting on the pin 82.

The upper lever portion 20 can be moved to its tilted position, in the following manner:

Initially, the shift lever 10 is moved to the PARKING position (P), in which the upper lever portion 20 is aligned with the lateral slot 76 in the guide member 70 and is permitted to be tilted. In this condition, however, the stop member 80 inhibits pivotal tilting motion of the upper lever portion 20.

Then, the manually operated knob 89 provided on the side wall of the covering member 90 is moved to the end of the arcuate groove 79 in the direction G indicated in FIG. 6, against the biasing force of the return spring 87. Consequently, the pivotable stop member 80 is simultaneously pivoted about the axis O—O, to its retracted position, away from the lateral slot 76,. Thus, the upper lever portion 20 is released by the stop member 80.

With the stop member 80 moved to the retracted position, the released upper lever portion 20 is pivoted under the biasing action of the torsion spring 50, toward the passenger's seat E, more precisely, to the substantially horizontal tilted position, in which the upper lever portion 20 abuts on the lower end of the lateral slot 76. During this tilting movement of the upper lever portion 20, the outside diameter D1 first passes through the width W3 of the lateral slot 76, and then the distance W1 between the parallel flats 23, 23 passes through the smaller width W4 of the slot 76. Accordingly, the upper lever portion 20 placed in its tilted position has only a slight gap between its flats 23, 23 and the inner surfaces defining the width W4 of the lateral slot 76.

The pivotal tilting movement of the upper lever portion 20 allows the stop member 80 to be pivoted about the axis O—O by the return spring 87, and thus restored to its operative position in which the top wall 80b partially closes the lateral slot 76. In this condition, the upper lever portion 20 is substantially locked in position by the lateral slot 76 and the inclined surface 80c of the stop member 80 in the operative position, such that the biasing force of the return spring 87 is exerted on the upper lever portion 20 via the inclined surface 80c of the stop member 80. According to this arrangement wherein the gap between the upper lever portion 20 and the slot 76 is very small, and the upper lever portion 20 is pressed downward by the return sprng 87, there may arise only a negligible degree of rattling movements of the upper lever portion 20 within the lateral slot 76, and therefore sustantially no patting noises may be generated, even when the shift lever 10 is is placed in the tilted position while the vehicle engine is on.

The above tilting of the upper lever portion 20 of the shift lever 10 to the substantially horizontal position facilitates a movement of the driver and/or passenger from the driver's seat D to the front passenger's seat E or vice versa.

The present shift lever assembly is particularly convenient for vehicles of a cab-over engine type wherein the shift lever 10 is positioned between the driver's and front passenger's seats D, E as indicated in FIG. 2. Since the upper lever portion 20 placed in the horizontal tilted position is accommodated within the space "c" inside the extension planes "a" and "b" of the seats D, E and floor F, the tilted upper lever portion 20 does not disturb the driver's movement from the driver's seat D to the passenger's seat E, thus permitting an utmost ease of the movement.

To return the tilted shift lever 10 to the operative position (PARKING position), the following procedure is used:

The tilted upper lever portion 20 can be restored to the PARKING position (P) by simply turning it about the axis Z—Z against the biasing force of the torsion spring 50, along the lateral slot 76, without operating the knob 89 for the stop member 80. With this pivotal movement of the upper lever portion 20, the stop member 80 is force to pivot about the axis O—O, with the inclined surface 80c held in abutting contact with the upper lever portion 20. As a result, the top wall 80b of the stop member 80 is moved away from the lateral slot 76. After the upper lever portion 20 clears the stop member 80, the stop member is automatically returned to the operative position of FIG. 4 by the return spring 87. Thus, the upper lever portion 20 of the lever 10 in the PARKING position is against blocked by the stop member 80 from being tilted down to the horizontal position.

While the torsion spring 50 is used to bias the upper lever portion 20 against the inner surface 73a of the guide slot 73 in the guide member 70, the torsion spring 50 may be replaced by a tension spring.

As is apparent from the foregoing description, the upper lever portion 20 may be turned down to the tilted position toward the front passenger's seat E only when the shift lever 10 is placed in its shift position (P). Further, the pivot axis Z—Z of the upper lever portion 20 is positioned within the accommodation space "c", that is, below and inside the extension planes "a" and "b". In addition, the tilted position of the upper lever portion 20 is also provided within the accommodation space "c", so that the tilted upper lever portion 20 and the knob 21 will not be an obstruction to the driver or passenger who moves between the driver's and front passenger's seats D, E.

Since the tilting of the upper lever portion 20 is permitted only when the shift lever 10 is in the shift position (P), an unintended contact of the driver with the tilted upper lever portion 20 during the driver's movement to the passenger's seat will not cause the shift lever 10 to be moved to the other shift position. That is, the tilted shift lever 10 is inhibited from being moved from the shift position (P) to the other shift positions which may cause the vehicle to start if the engine is kept on while the vehicle is parked with the shift lever 10 placed in the tilted position. Thus, the present tiltable shift lever assembly is designed for safety.

The externally visible lateral slot 76 in the guide member 70, and the corresponding opening 96 in the covering member 90, enable the vehicle driver to recognize the tiltable nature of the shift lever 10 and its tilting direction. Further, a simple shifting of the stopper release knob 89 in the direction G (in FIG. 6) will cause an automatic tilting movement of the upper lever portion 20 by the biasing force of the torsion spring 50, which normally acts on the upper lever portion 20 so as to hold the same portion 20 in pressed contact with the inner surface 73a of the guide slot 73. Thus, the upper lever portion 20 is easily tilted down to its horizontal position.

A further advantage of the presnt shift lever assembly is derived from the arrangement where the pivot axis O—O of the stop member 80 lies on the line A which passes the centerline of the lateral slot 76 and the pivot axis X—X of the shift lever 10. This arrangement permits the upper surface 80d of the top wall 80b of the stop member to follow the curvature of the inner surface 70d of the top wall 70b of the guide member 70, thereby assuring a a better sealing of the lateral slot 76 by the stop member 80 when placed in the operative position, while the shift lever 10 is held in the non-tilted position or in the fully tilted horizontal position. If the axis O—O does not lie on the line A, the outer surface 80d of the stop member 80 cannot follow the curvature of the inner surface 70d of the guide member 70, causing a considerable gap or clearance therebetween, at their front or rear portions, which reduces the sealing capability of the top wall 80d of the stop member 80.

A still further advantages of the instant shift lever assembly accrues from the arrangement wherein the inclined surface 80c of the stop member 80 is adapted to come into abutting contact with the upper lever portion 20 during a pivotal movement of the portion 20 back to the operative position. Since this inclined surface 80c is inclined relative to the centerline A of the lateral slot 76, the stop member 80 is once moved to the retracted position by a sliding contact of the upper lever portion 20 with the inclined surface 80c in the initial portion of the return movement of the stop member 80 toward its operative position. The stop member 80 is then automatically returned to the operative position (in which the top wall 80b partially closes the lateral slot 76) after the upper lever portion 20 clears the inclined surface 80c. Thus, the upper lever portion 20 can be easily restored to the operative position, without operating the knob 89.

Further, even if the cab T is tilted while the upper lever portion 20 is in the tilted horizontal position in front of the front passenger's seat E, a movement of the floor F of the cab T will automatically cause the tilted upper lever portion 20 to be returned to the operative position, without damaging the floor F or shift lever 10.

Yet another advnatage of the instant shift lever assembly results from the arrangement wherein the biasing force of the torsion spring 50 is utilized to turn down the upper lever portion 20 to its tilted horizontal position. Thus, the arrangement eliminates a spring exclusively used to tilt the upper lever portion 20, and contributes to reducing the cost of the assembly. Furthermore, the present arrangement protects the coupling of the shift lever 10 against an excessive load, improving the durability of the assembly. In addition, the covering member 90 and the guide member 70 which cover the tilting mechanism of the shift lever 10, serve to prevent the driver's or passenger's clothes from being caught by the mechanism or spoiled with a lubricating grease on the mechanism.

Figure 18:
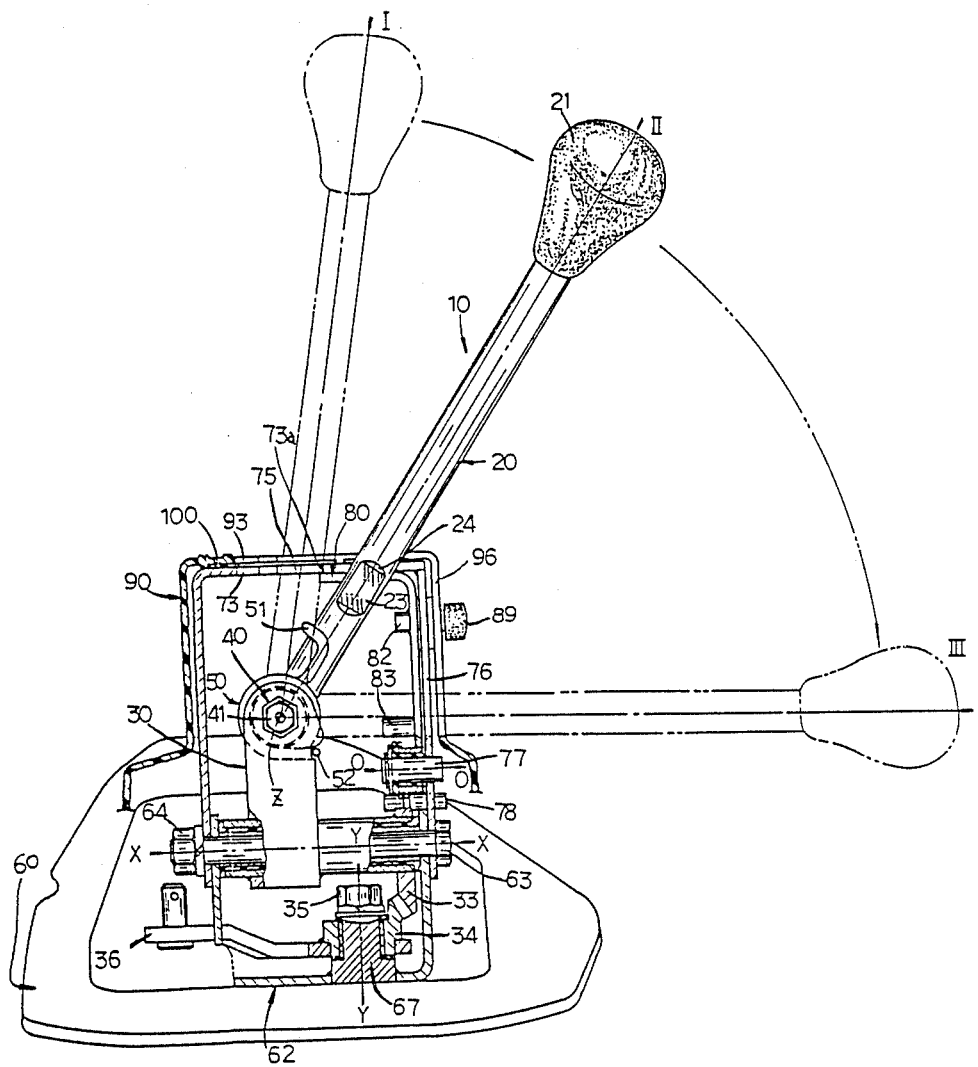
FIG. 18 is an elevational view corresponding to that of FIG. 5, showing another embodiment of the shift lever assembly of the invention.

Referring further to FIG. 18, there will be described a modified embodiment of the shift lever assembly according to the present invention. In the interest of brevity and simplification, the same reference numerals as used in the preceding embodiment will be used in FIG. 18, to identify the corresponding components.

This modified embodiment is different from the preceding embodiment only in that the upper lever portion 20 has an intermediate position II between the operative position I (PARKING position) and the fully tilted substantially horizontal position III, as indicated in FIG. 18. Namely, the upper lever portion 20 is temporarily stopped at the intermediate position II between the opposite longitudinal ends of the lateral slot 76. The intermediate temporary-stop position II is provided a short distance before the upper right corner of the guide member 70, as viewed in FIG. 18, which is farthest from the pivot axis Z—Z.

Described in greater detail, the upper lever portion 20 has a pair of inclined flat shoulder surfaces 24, 24 formed adjacent to the respective ends of the parallel flats 23, 23. These upper and lower shoulder surfaces 24, 24 terminate in the circumferential outer surface having the diameter D1 (FIG. 4). The upper and lower shoulder surfaces 24, 24 are positioned above and below the top wall 70b of the guide member 70 when the shift lever 10 is in the operative position (PARKING position).

As indicated in FIG. 4, the upper lever portion 20 placed in its PARKING position (P) is considerably inclined with respect to the vertical, in a plane parallel to the vertical and the pivot axis Z—Z. Therefore, after the upper lever portion 20 is released from the stop member 80, the upper lever portion 20 is moved in slightly pressed, sliding contact with the front inner surface 76a (FIG. 7) of the lateral slot 76, due to gravity of the inclined shift lever 10, until the upper inclined shoulder surface 24 comes into contact with the edge of the inner surface 76a which partially defines the lateral slot 76. In other words, the upper lever portion 20 is temporarily stopped at the intermediate position II, with the upper inclined shoulder surface 24 engaging the upper edge of the inner surface 76a.

Although the previously described and illustrated embodiment also has a pair of inclined flat shoulder surfaces similar to the shoulder surfaces 24, 24 of the present embodiment, the upper lever portion 20 cannot be stopped at a position in which the upper shoulder surface engages the upper edge of the inner surface 76a of the lateral slot 76, simply because the biasing force of the torsion spring 50 is larger than the engagement force between the inclined shoulder surface and the edge of the inner surface 76a. In the present embodiment, however, the biasing force of the torsion spring 50 is selected to be sufficient for moving the upper lever portion 20 to the intermediate position II, but considerably smaller than the force of engagement between the upper inclined shoulder surface 24 and the upper edge of the inner surface 76a of the lateral slot 76. That is, the biasing force of the torsion spring 50 and the angle of inclination of the upper shoulder surface 24 are determined so that the engagement of the shoulder surface 24 with the inner surface 76a is not released by the biasing force of the torsion spring 50. The intermediate position II may be adjusted by changing the position of the upper inclined shoulder surface 24.

After the upper lever portion 20 is stopped at the intermediate position II, the upper lever portion 20 is manually turned down to the fully tilted position III by the vehicle driver, with a suitable force sufficient to overcome the engagement force between the upper shoulder surface 24 and the edge of the inner surface 76. More specifically, the angle of inclination of the upper shoulder surface 24, the depth of the parallel flats 23, 23, and the width W3 of the lateral slot 76 are determined so as to permit the upper lever portion 20 to pass the intermediate position II, with a suitable force given to the upper level portion 20 by the vehicle driver.

While the present embodiment uses the upper inclined shoulder surface 24 as engagement means engageable with the guide member 70, at the intermediate position II, other suitable means may be used as the engagement means for temporarily stopping the upper lever portion 20. For example, the guide member 70 may be formed with a small protuberance or protuberances which is/are engageable with the upper lever portion 20 at the intermediate position II. Further, it is possible to use a so-called "lock ball mechanism" which includes a lock ball and a spring for biasing the ball.

In the shift lever assembly, the upper lever portion 20 will not be tilted down to the horizontal position II in one motion following the pivotal movement of the stop member 80 to its retracted position. The temporary stop of the upper lever portion 20 is effective to prevent otherwise possible hit of the portion 20 on the hand of the driver operating the release knob 89, or on the foot at the front passenger.

The above arrangement is also effective to avoid otherwise possible severe noisy impact of the upper lever portion 20 against the lower end of the lateral slot 76 under the biasing force of the torsion spring 50 and due to moment of inertia, whereby the life expectancy of the upper lever portion 20 and the guide member 70 can be increased.

Although the stop member 80 is formed with the straight inclined surface 80c adapted to be engageable with the upper lever portion 20 during a pivotal motion of the latter to the operative position, the straight inclined surface 80c may be replaced by a suitable curved surface.

The shift lever 10 used in the two embodiments illustrated above may be modified so as to incorporate a detent rod which is activated by a pushbutton provided on the shift knob, such that the detent rod is pushed down by the pushbutton to release its engagement with a guide slot in the guide member and thereby permit shifting movements of the shift lever.

Further, the pivot axis of the pivotable stop member 80 may be aligned with the pivot axis X—X of the shift lever 10.

FIGS. 19-23, FIGS. 24-25 and FIGS. 26-28 illustrate different arrangements of a further modified embodiment of the present invention. The same reference numerals and characters as used in the preceding embodiments will be used in these figures, to identify the functionally corresponding components. In the interest of simplification, redundant description of those components is held to a minimum, and the following description of the present modified embodiment is focused on the features not provided in the preceding embodiments.

The present modified embodiment uses a tiltable shift lever 110 includes an upper lever portion 112 having a knob 111 at its upper end, and a lower lever portion 113. The upper and lower lever portions 112, 113 are connected by the coupling 40 such that the two portions 112, 113 are pivotable about the pivot axis Z—Z in the transverse direction of the vehicle. As in the preceding embodiments, the shift lever 110 is supported pivotally about the pivot axis X—X primarily constituted by the bolt 63. The shift lever 110 extends through a covering member 115 and a lever boot 116 disposed within the covering member 115. The covering member 115 is adapted to cover the mechanisms for pivotally supporting the shift lever 110 about the axis X—X, and the upper lever portion about the axis Z—Z. The covering member 115 also serves as a guide member similar to the guide member 70 used in the preceding embodiments. The covering member 115 is hereinafter referred to as a "guide member". The lever boots 116 functions to protect the interior of the vehicle against entry of water, mud, dust and dirt and isolate the vehicle interior from external noises.

The shift lever 110, bolt 63, guide member 115 and lever boot 116 are supported by the lever retainer 62 secured to the vehicle frame. On the portions of the bolt 63 outside the upright portions 62a, 62a of the lever retainer 62, there are fitted a pair of spacers 119, 119 to which the lever boot 116 is fixed. The spacers 119 are sandwiched between the upright portions 62a, 62a of the lever retainer 60, and the lower portions of the guide member 115 through which the bolt 63 is inserted.

The lower lever portion 113 is fixed via the bifurcated lever support 31 to the sleeve 32, which is supported rotatably about the bolt 63. As in the preceding embodiments, the pivotal movement of the shift lever 110 about the axis X—X in the longitudinal direction of the vehicle is converted by the bevel gears 33, 34 into a pivotal movement of the control lever 36.

Figure 20:
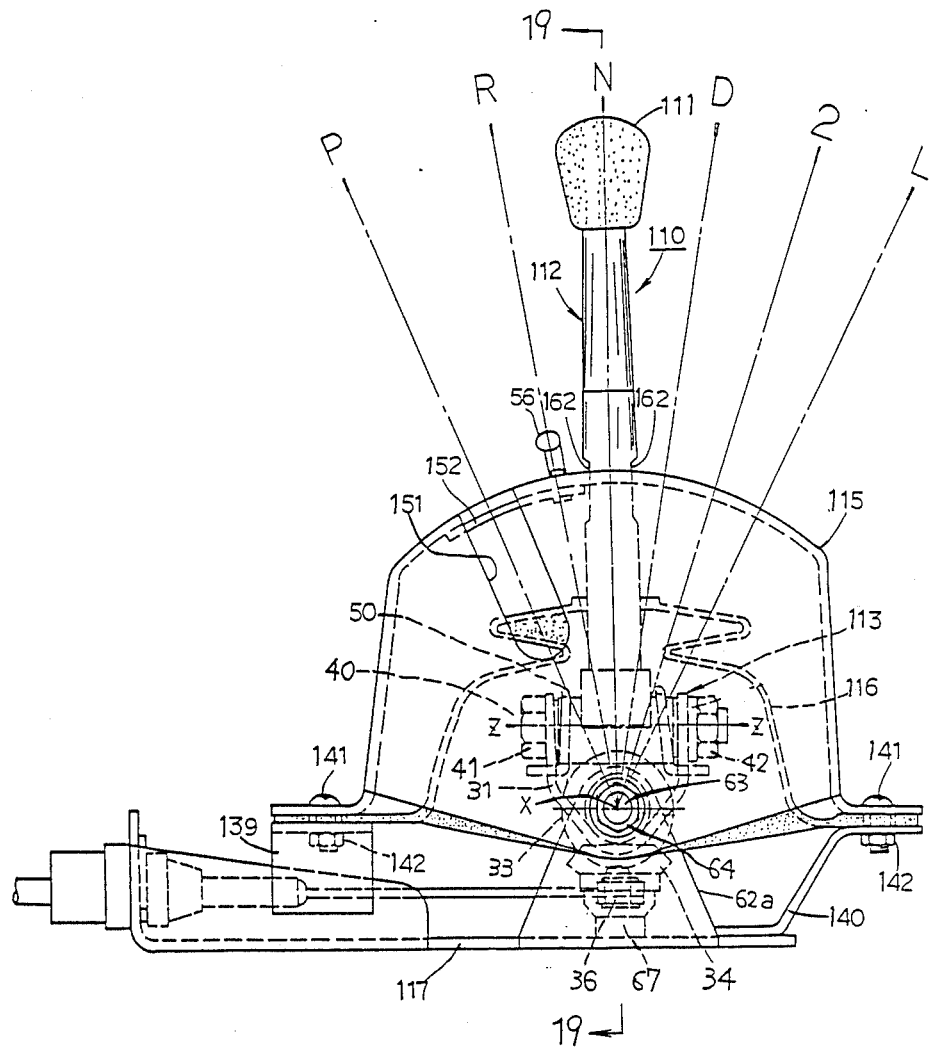
FIG. 20 is an elevational view corresponding to that of FIG. 1, of the shift lever assembly of FIG. 19.
Figure 24:
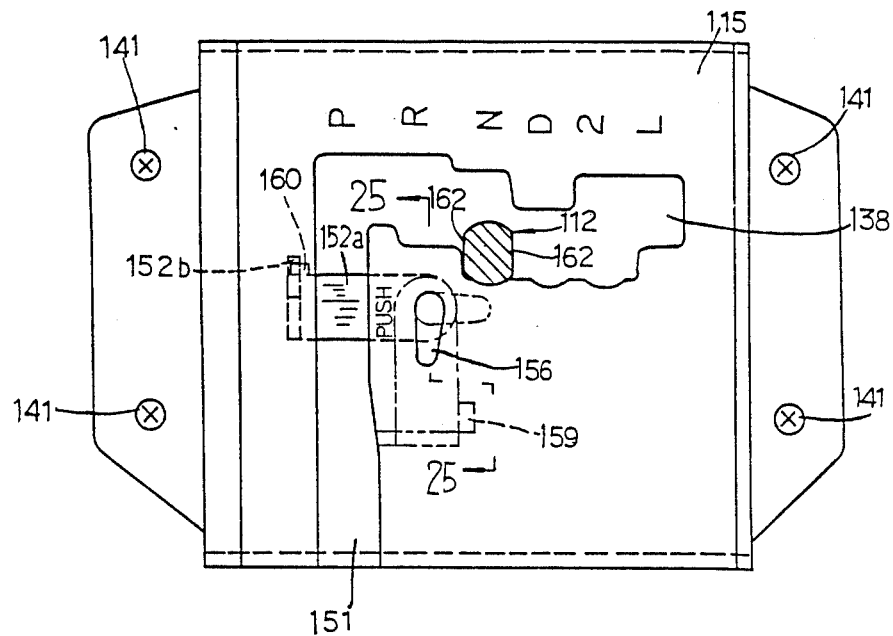
FIGS. 24 and 25 are views corresponding to those of FIGS. 22 and 23, illustrating a variation of the embodiment of FIGS. 19-23 of the invention.

The guide member 115 and the lever boot 116 are further secured to support members 139, 140 (FIG. 20) fixed to the bracket 117, via screws 141 and nuts 142. The guide member 115 has a guide slot 138 through which the upper lever portion 112 extends at its parallel flats 162, 162, as shown in FIGS. 20 and 24. The upper lever portion 112. Similarly, the lever boot 116 has a hole through which the upper lever portion 112 extends.

Figure 19:
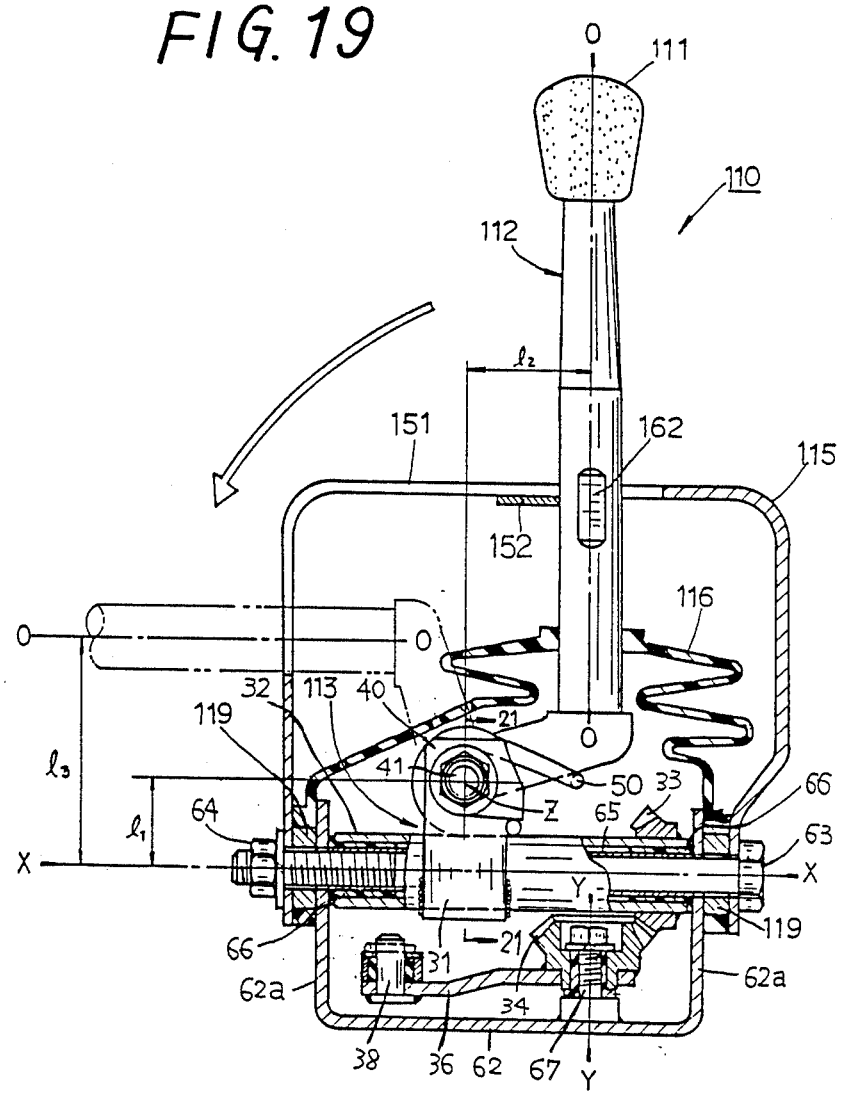
FIG. 19 is an elevational view corresponding to that of FIG. 5, showing a further embodiment of the invention.
Figure 21:
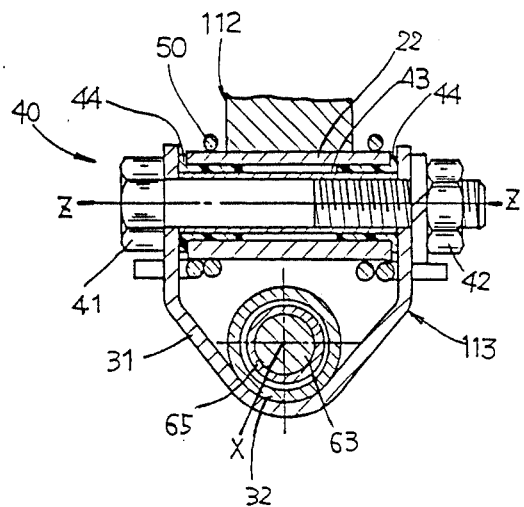
FIG. 21 is an enlarged view in cross section taken along line 21—21 of FIG. 19.
Figure 22:
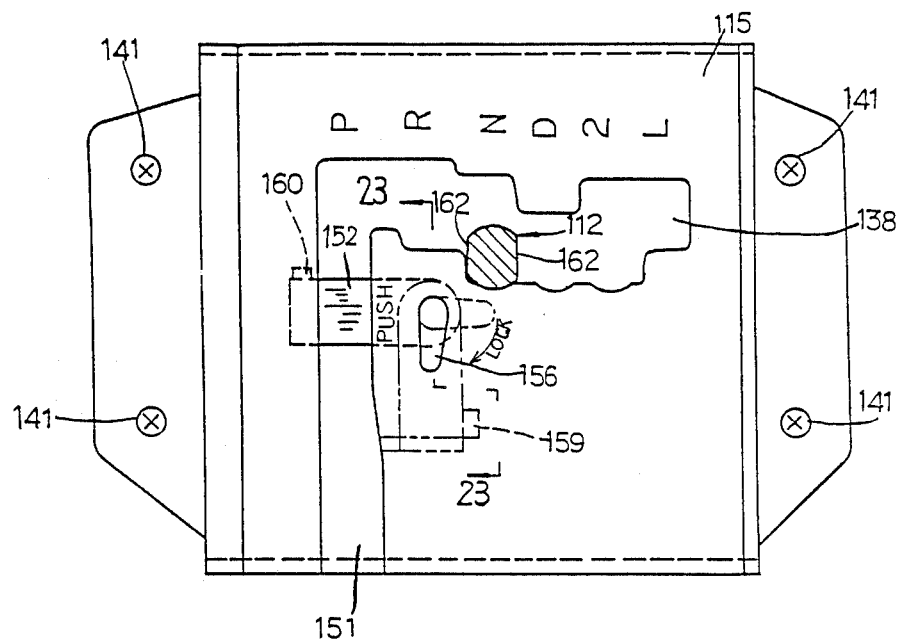
FIG. 22 is a plan view of the shift lever assembly of FIG. 19.
Figure 23:
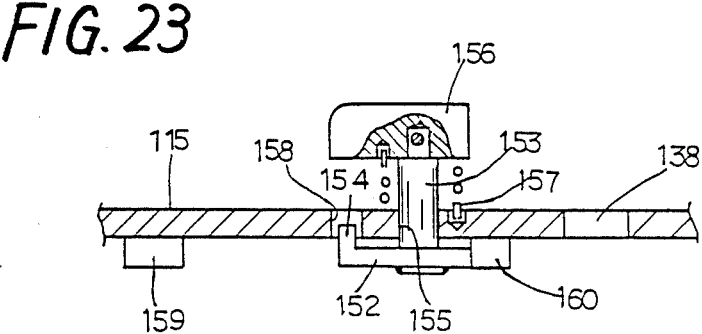
FIG. 23 is an enlarged cross sectional view taken along line 23—23 of FIG. 22.

The first arrangement of the present modified embodiment will be described in detail, referring to FIGS. 21-23 in particular. As shown in FIG. 21, the lowr end of the upper lever portion 112 is secured to the sleeve 22 of the coupling 44 which has substantially the same construction as shown in FIG. 4 of the first embodiment. The torsion spring 50 biases the upper lever portion 112 in the left direction as seen in FIG. 19.

The guide member 115 further has a lateral slot 151 similar to the lateral slot 76 of the preceding embodiments. A pivotable stop member in the form of a lock lever 152 is provided to block the upper lever portion 112 from being provided about the axis Z—Z, that is, from tilting while moving through the lateral slot 151. This lock lever 152 includes a shaft 153 extending through the guide member 115, a lock jaw 154 spaced away from the axis of the shaft 153, and a manually operated knob 156 fixed to the upper end of the shaft 153. Between the knob 156 and the upper surface of the guide member 115, there is disposed a compression coil spring 157 which biases the lock lever 152 in the upward direction. This spring 157 also serves as a torsion spring, as described later. Thus, the lock lever 152 is supported such that it is movable in the axial direction of the shaft 153, and rotatable about the shaft 153 between its lock position (sown in FIGS. 22 and 23), and its retracted position. In the lock position, the lock jaw 154 engages a positioning hole 158. The lock lever 152 can be unlocked by depressing the knob 156. In this condition, the lock lever 152 can be pivoted to the retracted position indicated in phantom line in FIG. 22. In this retracted position, the lock lever 152 biased by the spring 157 is held in abutting contact with a stop 159 formed on the inner surface of the guide member 115. In the lock position, the lock lever 152 is stopped by another stop 160 also formed on the inner surface of the guide member 115.

In the above arrangement, the upper lever portion 112 placed in the PARKING position (P) is held in abutting contact with the lock lever 152, under the biasing action of the torsion spring 50. In this condition, the lock lever 152 is maintained in its lock position with its lock jaw 154 engaging the hole 158.

Referring back to FIG. 19, the pixot axis X—X about which the shift lever 110 is pivoted, is offset by a distance l1 from the pivot axis Z—Z about which the upper lever portion 112 is pivoted. Further, the pivot axis X—X is offset by a distance l2 from a centerline O—O of the upper lever portion 112.

To tilt the upper lever portion 112 to its substantially horizontal tilted position, the release knob 156 of the lock lever 152 (stop member) is first pushed to disengage the lock jaw 154 from the hole 158. The unlocked lock lever 152 is then pivoted about the shaft 153 to its retracted position in which the lock lever 152 is held in abutment with the stop 159, by the spring 157.

After the lock lever 152 has been pivoted to the retracted position, the upper lever portion 112 is pivoted about the axis Z—Z to the tilted position while the upper lever portion 112 is guided by the lateral slot 151.

To restore the upper lever portion 112 to its operative position, the lever portion 112 is pivoted upward about the axis Z—Z until the lever portion 112 becomes substantially upright. Then, the knob 156 is turned clockwise (in FIG. 22) to move the lock lever 152 to its lock position (until the lever 152 abuts on the stop 160), whereby the lock jaw 154 is put into engagement with the hole 158 under the biasing force of the compression coil spring 157.

In the tilted position, the centerline O—O of the upper lever portion 112 has a height l3 as measured from the pivot axis X—X. This height l3 (distance between the centerline O—O and the axis X—X), and a distance of projection of the upper lever portion 112 from the guide member 115, can be adjusted by selecting the offset distances l1 and l2, that is, the distance l1 between the axes X—X and Z—Z, and the distance l2 between the axis Z—Z and the centerline O—O. Accordingly, the instant arrangement is easily adaptable to different configurations of the vehicle in terms of the front passenger's seat and floor.

Figure 25:
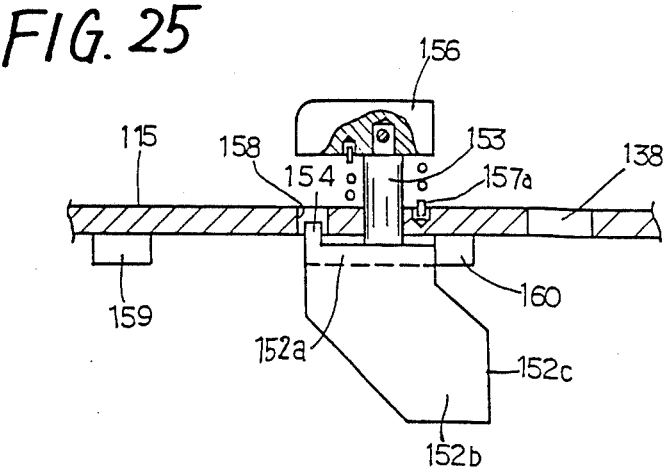

Referring next to FIGS. 24 and 25, a variation of the instant modified embodiment of the invention will be described. In this second arrangement, a lock lever 152a and a spring 157a are used in place of the lock lever 152 and spring 157 of FIGS. 22 and 23. The lock lever 152a is biased by the spring 157a in its pivoting direction so that the lever 152a is normally placed in its lock position, i.e., held in contact with the stop 160. The torsional biasing force of the spring 157 as a torsion spring is sufficiently smaller than the biasing force of the torsion spring 50 for the upper lever portion 112.

The lock lever 152a has a doward extension 152b at its end remote from the shaft 153, so that the lever 152a has a generally L shape in cross section. In the lock position, the downward extension 152b has a lnegth so that the extension 152b is engageable with the upper lever portion 112 placed in its tilted position.

When the the lock lever 152a is unlocked by depressing the knob 156, the lock lever 152a is pivoted to its retracted position by a pivoting movement of the upper lever portion 112 toward its tilted position, since the biasing force of the torsion spring 50 is larger than the 4iasing force of the spring 157a biasing the lock lever 152a toward its lock position. As a result, the downward extension 152b of the lock lever 152a abuts, at its end face 152c, on the upper lever portion 112 placed in its horizontal tilted position. Thus, the lock lever 152a is prevented by the tilted upper lever portion 112 from being returned to its operative or lock position by the spring 157a.

With the upper lever portion 112 returned to its generally upright operative position, the downward extension 152b is disengaged from the upper lever portion 112, and the lock lever 152a is automatically returned to its lock position with its lock jaw automatically engaging the hole 158. Thus, in the present arrangement, the lock lever 152a is automatically restored to the lock position by simply returning the upper lever portion 112 to the operative position, without operating the release knob 156 of the lock lever 152a.

Figure 26:
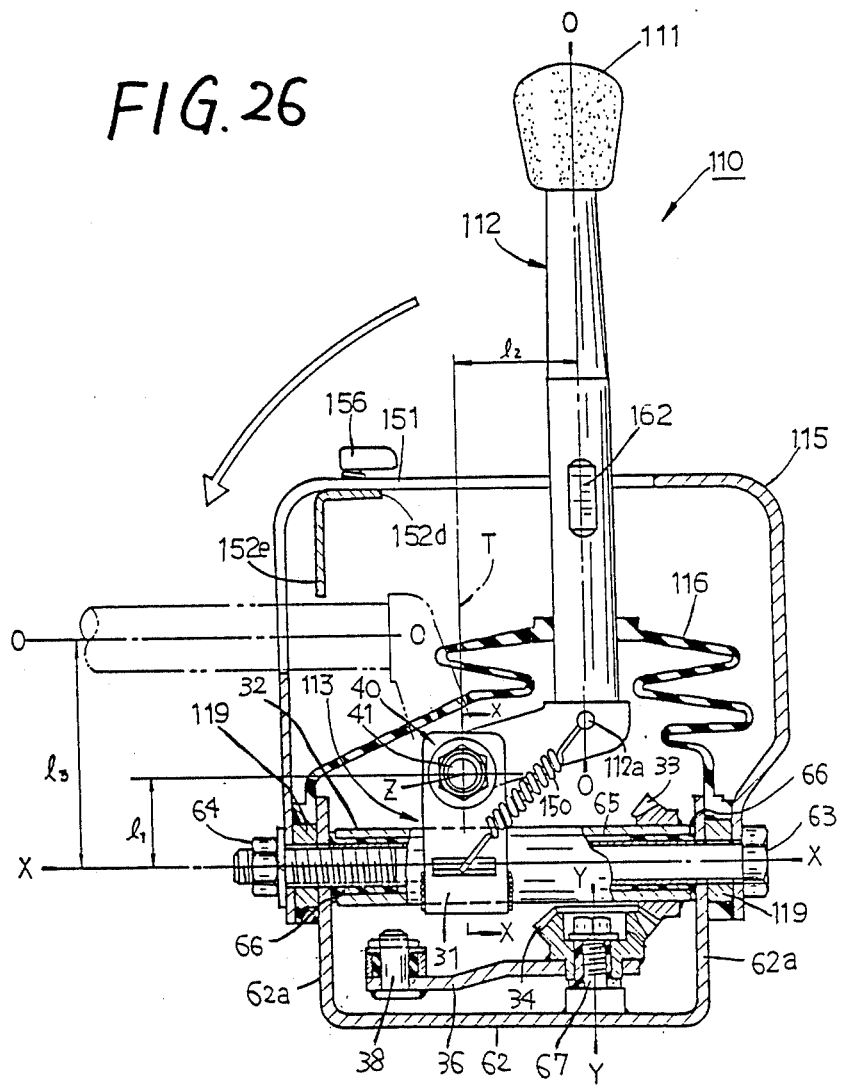

Another variation of the present modified embodiment will be described, referring to FIGS. 26-28 wherein a tension spring 150 is used in place of the torsion spring 50 used in the preceding embodiments. This spring 150 biases the upper lever portion 112 in the direction opposite to the biasing direction of the spring 50. Namely, the upper lever portion 112 is normally held in abutting contact with an inner surface 163 of the guide slot 138a in the guide member 115, as shown in FIG. 28.

Figure 27:
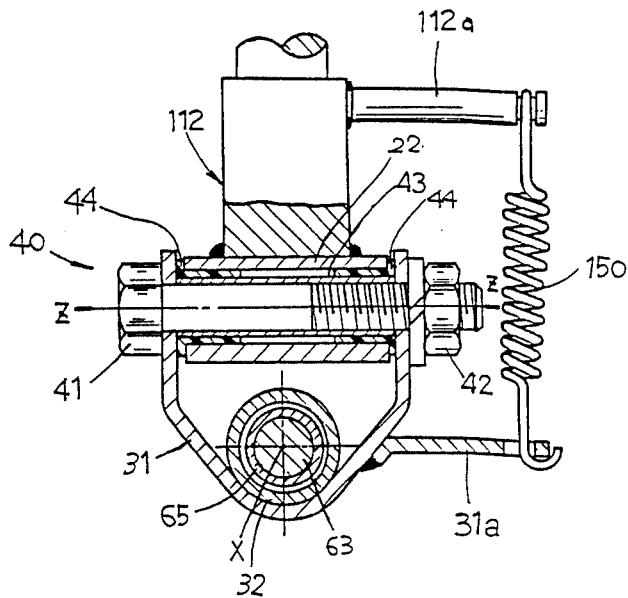
FIGS. 26, 27 and 28 are views corresponding to those of FIGS. 19, 21 and 22, respectively, depicting another variation of the embodiment of FIGS. 19-23.
Figure 28:
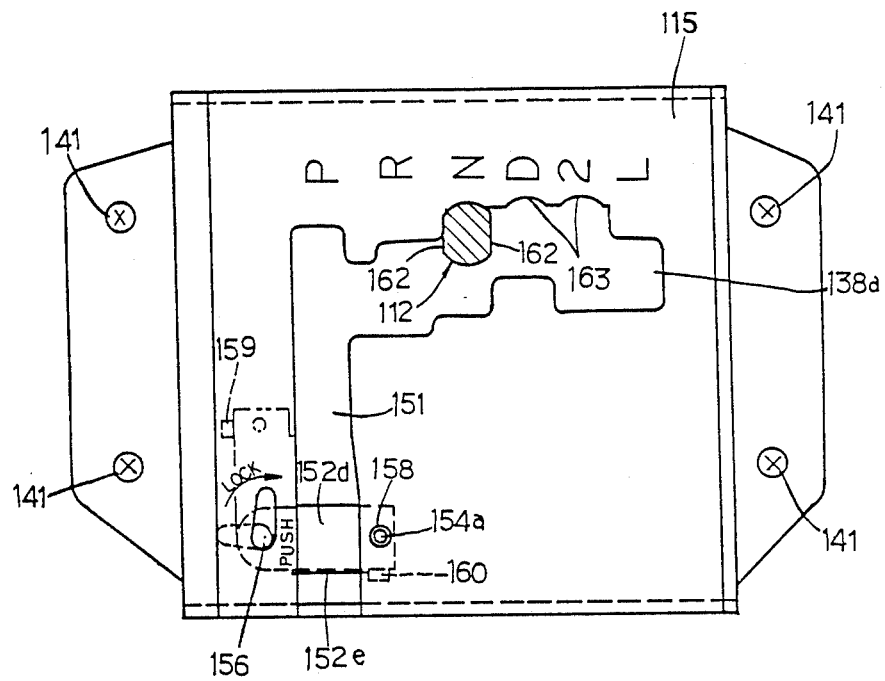

More specifically, the upper lever portion 112 has a rod 112a fixed thereto so as to extend parallel to the pivot axis Z—Z (centerline of the bolt 41), as illustrated in FIG. 27. On the other hand, the bifurcated lever support 31 of the lower lever portion 113 has a bracket 31a fixed thereto so as to extend parallel to the rod 112a. The tension spring 150 is connected at its opposite ends to the rod 112a and bracket 31a. As shown in FIG. 26, the position of the rod 112a on the upper lever portion 112 is determined such that when the lever portion 112 is in the upright operative position, the rod 112a is located to the right (as viewed in FIG. 26) of a plane T which passes the axis Z—Z and a point of connection of the spring 150 and the bracket 31a. Further, the position of the rod 112a is determined such that the rod 112a is located to the left of the plane T when the upper lever portion 112 is placed in its horizontal tilted position. Thus, the spring 150 constitutes a part of a turn-over spring mechanism.

In the present variation, a stop member in the form of a lock lever 152d is used in place of the lock lever 152b used in the preceding variation of FIGS. 24 and 25. The lock lever 152d has a pivot axis on the left-hand side of the lateral slot 151 as viewed in FIG. 28. The lock lever 152d has a downward extension 152e which extends downwardly so that the lower end of the extension 152e is engageable with the upper lever portion 112 placed in its tilted position. The lock position of the lock lever 154d is determined by an engagement of a lock jaw 154a with the hole 158 which is formed in a portion of the guide member 115 on the right-hand side of the lateral slot 151, as indicated in FIG. 28.

In tilting the upper lever portion 112, the release knob 156 is first pushed to unlock the lock lever 152d, and the lock lever is turned to the retracted position to permit a pivoting motion of the upper lever portion 112 to its tilted position against the biasing force of the tension spring 150. After the position of the rod 112a has passed the plane T shown in FIG. 26, the upper lock lever 112 is pivoted to the tilted position by the biasing force of the tension spring 150. Then, the lock lever 152d is turned back to its lock position, until the lock lever 152d comes into abutment with the stop 160. The lock jaw 154a is brought into engagement with the hole 158. In this lock position of the lock lever 152d, the tilted upper lever portion 112 abuts on the lower end of the downward extension 152e, and is thus prevented from returning to its upright operative position by the tension spring 150.

In the present arrangement, the tilted upper lever portion 112 of the shift lever 110 cannot be restored to its operative position, unless the lock lever 152d is once turned to the retracted position.

Although the guide member 115 used in the three different arrangements of the embodiment of FIGS. 19-28 also functions as a covering member for the internal mechanisms of the shift lever assembly, a separate covering member like the covering member 90 used in the preceding embodiments may be employed.

While all of the illustrated various embodiments of the tiltable shift lever assembly of the invention are adapted to an automatic transmission of a motor vehicle, the principle of the invention is equally applicable to a tiltable shift lever assembly for a manual transmission. In this case, the guide member for guiding the shift lever and the covering member, if provided, are formed with a lateral slot or opening which permits the upper portion of the shift lever to be tilted down toward the front passenger's seat, only when the shift lever is placed in its neutral position rather than the PARKING position.

While the present invention has been described in detail in its preferred embodiments, it is to be understood that the invention is not limited to the described and illustrated details, but may be embodied with various changes, modifications and improvements, which may occur to those skilled in the art, without departing from the spirit and scope of the invention defined in the following claims.

What is claimed is:

1. A tiltable shift lever assembly for operating a transmission of an automotive vehicle which has a floor, a driver's seat, and a front passenger's seat, said tiltable shift lever assembly, comprising:
    a shift lever disposed between said driver's seat and said front passenger's seat, so as to extend generally upward above said floor when placed in an operative position thereof, said shift lever having a shift knob at an upper end thereof and being supported pivotally about a first pivot axis which is substantially parallel to a transverse direction of the vehicle;
    said shift lever including an upper portion having said shift knob, a lower portion operatively connected to said transmission, and a coupling connecting said upper and lower portions such that said upper portion is pivotable relative to said lower portion, about a second pivot axis which is substantially parallel to a longitudinal direction of the vehicle;
    a guide member fixedly disposed above said coupling of the shift lever, and having a guide slot formed therethrough in a direction substantially parallel to said longitudinal direction, said upper portion of the shift lever extending through said guide slot, and being guided by the guide slot during a pivotal movement of said shift lever about said first pivot axis;
    said guide member further having a lateral slot formed therethrough so as to extend in said transverse direction from one longitudinal position of said guide slot, said lateral slot permitting said upper portion of the shift lever to be pivoted about said second pivot axis until said upper portion is placed in a substantially horizontal position thereof.

2. A shift lever assembly according to claim 1, wherein said guide member covers said coupling and lower portion of the shift lever.

3. A shift lever assembly according to claim 1, further comprising a covering member which covers said guide member, and said coupling and lower portion of the shift lever, said covering member having an opening through which said upper portion of the shift lever extends and which permits said upper portion to be pivoted about said first and second pivot axes.

4. A shift lever assembly according to claim 1, wherein said shift lever has a parking position for placing said transmission in a parking state, said one longitudinal position of said guide slot consisting of said parking position.

5. A shift lever assembly according to claim 1, wherein said floor includes a stepped portion having a generally upwardly extending part which extends from an extremity of a horizontal portion of the floor in front of said driver's and front passenger's seats, an extension plane of said generally upwardly extending part and extension planes of upper surfaces of said seats defining an accommodation space on a side nearer to said seats, said coupling being positioned within said accommodation space, and said upper portion of the shift lever when placed in said substantially horizontal position lying in said accommodation space.

6. A shift lever assembly according to claim 5, wherein said substantially horizontal position of said upper portion of the shift lever is established by pivoting said upper portion toward said front passenger's seat.

7. A shift lever assembly according to claim 5, wherein said guide member lies in said accommodation space.

8. A shift lever assembly according to claim 1, further comprising:
    a movable stop member which is movable between an operative position in which said stop member blocks said upper portion of the shift lever from moving through said lateral slot from said longitudinal slot, and a retracted position in which said stop member permits said upper portion to move through said lateral slot; and
    a manuallly controlled member for moving said movable stop member from said operative position to said retracted position.

9. A shift lever assembly according to claim 8, further comprising a stop-member for biasing said movable stop member toward said operative position, and wherein said movable stop member is supported by said guide member pivotally about a third pivot axis, and said guide member has an arcuate groove formed therethrough along an arc of a circle having a center on said third pivot axis, said manually controlled member extending through said arcuate groove, said operative and retracted positions of said movable stop member being determined by abutting contact of said manually operated member with respective portions of said guide member which define opposite ends of said arcuate groove.

10. A shift lever assembly according to claim 8, wherein said lateral slot is formed in a pivot plane which includes said first pivot axis, said movable stop member being supported pivotally about a third pivot axis which is located parallel to and above said first pivot axis in said pivot plane.

11. A shift lever assembly according to claim 8, further comprising a stop-member for biasing said movable stop member toward said operative position, and wherein said movable stop member includes an inclined portion which comes into contact with said upper portion of the shift lever when said upper portion is returned from said substantially horizontal position to said operative position thereof, said inclined portion having an inclined surface inclined relative to the longitudinal direction of said lateral slot, said movable stop member being moved to said retracted position against a biasing action of said stop-member, due to abutting contact of said upper portion with said inclined surface during a pivotal motion of the upper portion to said operative position thereof.

12. A shift lever assembly according to claim 8, further comprising a lever spring for biasing said upper portion of the shift lever to force said upper portion against one of opposite inner surfaces of the guide member which define said guide slot, said lateral slot originating from said one of the opposite inner surfaces of the guide member, whereby said upper portion of the shift lever being pivoted toward its substantially horizontal position by a biasing force of said lever spring while being guided through said lateral slot, when said movable stop member is moved to its retracted position.

13. A shift lever assembly according to claim 12, further comprising temporary stop means for temporarily stopping a pivotal motion of said upper portion of the shift lever due to said biasing force of said lever spring, at an intermediate position between opposite longitudinal ends of said lateral slot.

14. A shift lever assembly according to claim 13, wherein said temporary stop means comprises:
said lateral slot having an intermediate portion which is farthest from said second pivot axis;
said shift lever when placed in said one longitudinal position of said guide slot being inclined with respect to a vertical, in a plane substantially parallel to said vertical and said second pivot axis, said upper portion of the shift lever when positioned so as to extend through said lateral slot being maintained in sliding contact with one of opposite inner surfaces of the guide member defining said lateral slot, due to gravity of the inclined shift lever; and
said upper portion of the shift lever including engagement means which comes into engagement with said one of opposite inner surfaces and thereby stop said pivotal movement thereof when said upper portion reaches said intermediate portion of said lateral slot, said engagement means permitting said upper portion of the shift lever to be manually moved from said intermediate position of said lateral slot to said substantially horizontal position.

15. A shift lever assembly according to claim 14, wherein said engagement means has an inclined surface which is engageable with said one inner surface of the guide member, at said intermediate position, said biasing force of said lever spring and an angle of inclination of said inclined surface of the engagement means being determined so that an engagement of said inclined surface with said one inner surface is not released by the biasing force of said lever spring.

16. A shift lever assembly according to claim 12, wherein said automotive vehicle has a tiltable cab which is pivotable to a tilted position, about a fourth pivot axis located near a front end of the vehicle, such that the shift lever assembly remains in position on a frame of the vehicle, the biasing force of said lever spring being determined so as to permit said upper portion of the shift lever to be pivoted by said tiltable cab from said substantially horizontal position to said operative position when said tiltable cap is pivoted to said tilted position with said upper portion placed in said substantially horizontal position.

17. A shift lever assembly according to claim 13, wherein said automotive vehicle has a tiltable cab which is pivotable to an tilted position, about a fourth pivot axis located near a front end of the vehicle, such that the shift lever assembly remain in position on a frame of the vehicle, the biasing force of said lever spring being determined such that said upper portion of the shift lever is substantially free from a biasing action of said lever spring, while said upper portion of the shift lever is placed in a position between said intermediate position of said lateral slot and said substantially horizontal position thereof.

18. A shift lever assembly according to claim 1, wherein said second pivot axis of said upper portion of the shift lever is offset by a first predetermined distance from said first pivot axis of said shift lever in a substantially vertical direction, while a centerline of said upper portion is offset by a second predetermined distance from said second pivot axis in said transverse direction of the vehicle.

* * * * *